United States Patent
Sivalingam et al.

(10) Patent No.: US 12,039,749 B2
(45) Date of Patent: Jul. 16, 2024

(54) LOW POWER VISUAL TRACKING SYSTEMS

(71) Applicant: QUALCOMM Incorporated, San Diego, CA (US)

(72) Inventors: Ravishankar Sivalingam, San Jose, CA (US); Donald William Kidwell, Los Gatos, CA (US); Russell Gruhlke, San Jose, CA (US); Edwin Chongwoo Park, San Diego, CA (US); Khurshid Syed Alam, Mountainview, CA (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 16/904,466

(22) Filed: Jun. 17, 2020

(65) Prior Publication Data
US 2021/0398314 A1    Dec. 23, 2021

(51) Int. Cl.
| | |
|---|---|
| G06T 7/73 | (2017.01) |
| G06F 3/01 | (2006.01) |
| G06F 3/0346 | (2013.01) |
| H04N 23/90 | (2023.01) |

(52) U.S. Cl.
CPC ............... *G06T 7/73* (2017.01); *G06F 3/012* (2013.01); *G06F 3/0346* (2013.01); *H04N 23/90* (2023.01); *G06T 2207/10048* (2013.01)

(58) Field of Classification Search
CPC . G06T 7/73; G06T 2207/10048; G06F 3/012; G06F 3/0346
See application file for complete search history.

(56) References Cited

U.S. PATENT DOCUMENTS

| | | | |
|---|---|---|---|
| 10,504,231 B2 | 12/2019 | Fiala | |
| 2016/0091899 A1* | 3/2016 | Aldred | B60L 53/14 901/1 |
| 2017/0061186 A1* | 3/2017 | Laurent | G06K 7/1421 |

(Continued)

FOREIGN PATENT DOCUMENTS

WO    2020102554 A1    5/2020

OTHER PUBLICATIONS

International Search Report and Written Opinion—PCT/US2021/029231—ISA/EPO—Jul. 29, 2021.

*Primary Examiner* — Benjamin C Lee
*Assistant Examiner* — Nathan P Brittingham
(74) *Attorney, Agent, or Firm* — QUALCOMM Incorporated

(57) ABSTRACT

Systems, methods, and non-transitory media are provided for low-power visual tracking systems. An example method can include receiving one or more images captured by each image sensor system from a set of image sensor systems on a first device, the one or more images capturing a set of patterns on a second device, wherein the first device has lower power requirements than the second device, the set of patterns having a predetermined configuration on the second device; determining, from the one or more images captured by each image sensor system, a set of pixels corresponding to the set of patterns on the second device; determining, based on the set of pixels corresponding to the set of patterns, a location and relative pose in space of each pattern; and determining, based on the location and relative pose of each pattern, a pose of the first device relative to the second device.

30 Claims, 11 Drawing Sheets

(56) References Cited

U.S. PATENT DOCUMENTS

| | | |
|---|---|---|
| 2019/0113966 A1 | 4/2019 | Connellan et al. |
| 2020/0026348 A1 | 1/2020 | Nienstedt et al. |
| 2020/0364521 A1* | 11/2020 | Bradski .................. G06V 10/25 |
| 2021/0350566 A1* | 11/2021 | Hu ........................ G06T 19/006 |

* cited by examiner

LOW POWER VISUAL TRACKING SYSTEMS

TECHNICAL FIELD

The present disclosure generally relates to visual tracking systems for extended reality and other applications.

BACKGROUND

Pose estimation can be used in various applications, such as extended reality (e.g., virtual reality, augmented reality, mixed reality, etc.), computer vision, and robotics, to determine the position and orientation of an object and/or device relative to a target, such as a scene, a human, another object and/or another device. The pose information can be used to manage interactions between the object/device and the scene, the human, the other object and/or the other device. For example, the pose (e.g., position and orientation) of a robot can be used to allow the robot to manipulate an object or avoid colliding with an object when moving about a scene. As another example, the relative pose of a device worn by a user and a device controller can be used to provide the user an extended reality experience where the pose and movements of the device controller are tracked and rendered on the device worn by the user. However, the computational complexity of pose estimation systems can impose significant power and resource demands, and can be a limiting factor in various applications. The computational complexity of pose estimation can also limit the performance and scalability of tracking and localization applications that rely on pose information.

BRIEF SUMMARY

Disclosed are systems, methods, and computer-readable media for low power visual tracking for extended reality and other applications. According to at least one example, a method is provided for low power visual tracking for extended reality and other applications. The method can include receiving one or more images captured by at least one image sensor system on a first device, the one or more images capturing a set of patterns having a predetermined configuration on a second device, wherein the first device has lower power requirements than the second device; determining, from the one or more images captured by the at least one image sensor system, a set of pixels corresponding to the set of patterns on the second device; determining, based on the set of pixels corresponding to the set of patterns on the second device, a location and a relative pose in space of each pattern from the set of patterns; and determining, based on the location and the relative pose in space of each pattern from the set of patterns, a pose of the first device relative to the second device.

According to at least one example, an apparatus is provided for low power visual tracking for extended reality and other applications. The apparatus can include memory; and one or more processors coupled to the memory, the one or more processors being configured to receive one or more images captured by at least one image sensor system on the apparatus, the one or more images capturing a set of patterns having a predetermined configuration on a device, wherein the apparatus has lower power requirements than the device; determine, from the one or more images captured by the at least one image sensor system, a set of pixels corresponding to the set of patterns on the device; determine, based on the set of pixels corresponding to the set of patterns on the device, a location and a relative pose in space of each pattern from the set of patterns; and determine, based on the location and the relative pose in space of each pattern from the set of patterns, a pose of the apparatus relative to the device.

According to at least one example, a non-transitory computer-readable medium is provided for low power visual tracking for extended reality and other applications. The non-transitory computer-readable medium can include instructions stored thereon which, when executed by one or more processors, cause the one or more processors to receive one or more images captured by at least one image sensor system on a first device, the one or more images capturing a set of patterns having a predetermined configuration on a second device, wherein the first device has lower power requirements than the second device; determine, from the one or more images captured by the at least one image sensor system, a set of pixels corresponding to the set of patterns on the second device; determine, based on the set of pixels corresponding to the set of patterns on the second device, a location and a relative pose in space of each pattern from the set of patterns; and determine, based on the location and the relative pose in space of each pattern from the set of patterns, a pose of the first device relative to the second device.

According to at least one example, an apparatus is provided for low power visual tracking for extended reality and other applications. The apparatus can include means for receiving one or more images captured by at least one image sensor system on a first device, the one or more images capturing a set of patterns having a predetermined configuration on a second device, wherein the first device has lower power requirements than the second device; determining, from the one or more images captured by the at least one image sensor system, a set of pixels corresponding to the set of patterns on the second device; determining, based on the set of pixels corresponding to the set of patterns on the second device, a location and a relative pose in space of each pattern from the set of patterns; and determining, based on the location and the relative pose in space of each pattern from the set of patterns, a pose of the first device relative to the second device.

In some examples, the at least one image sensor system the method, apparatuses, and non-transitory computer-readable storage medium described above can include a set of image sensor systems, and determining the pose of the first device relative to the second device (or the apparatus relative to the device) is further based on predetermined relative locations and orientations of the set of image sensor systems.

In some aspects, the method, apparatuses, and non-transitory computer-readable storage medium described above can include determining three-dimensional (3D) coordinates of one or more points in space associated with a scene captured by the set of image sensor systems; and determining, based on the predetermined relative locations and orientations of the set of image sensor systems and the 3D coordinates of the one or more points in space, relative 3D poses of the set of image sensor systems on the first device (or apparatus), wherein the pose of the first device (or apparatus) relative to the second device is further based on the relative 3D poses of the set of image sensor systems on the first device (or apparatus).

In some examples, the pose of the first device (or the apparatus) relative to the second device includes a six degrees of freedom (6DoF) pose, and the predetermined configuration of the set of patterns includes a relative location of each pattern on the second device, a relative orientation of each pattern on the second device, a shape of each pattern, a size of each pattern, a characteristic of each pattern, and/or an arrangement of the set of patterns.

In some cases, determining the location and relative pose in space of each pattern from the set of patterns includes determining 3D orientations of the set of patterns by rotating 3D coordinates in space that correspond to the set of pixels corresponding to the set of patterns, the 3D coordinates being rotated relative to reference 3D coordinates; and determining 3D locations of the set of patterns by translating the 3D coordinates in space corresponding to the set of pixels corresponding to the set of patterns, the 3D coordinates being translated relative to the reference 3D coordinates. In some examples, the relative pose of each pattern can be based on the 3D orientations of the set of patterns and the 3D locations of the set of patterns, and the location of each pattern includes a respective 3D location from the 3D locations of the set of patterns.

In some aspects, determining the pose of the first device (or apparatus) relative to the second device further includes determining a pose of the second device relative to the first device (or apparatus), wherein the pose of the first device (or apparatus) includes a first 6DoF pose and the pose of the second device includes a second 6DoF pose.

In some examples, the first device (or apparatus) can include a hand controller device and the second device can include a head-mounted display device.

In some examples, the at least one image sensor system can include a low power image sensor system, and each pattern of the set of patterns is visible in an infrared spectrum and/or a visible light spectrum.

In some aspects, the at least one pattern of the set of patterns includes encoded machine-readable information, the encoded machine-readable information including location information associated with the at least one pattern, an identifier associated with the at least one pattern, a unique code, a setting, and/or information about a user account associated with an extended reality application hosted on the first device (or apparatus) and/or the second device.

In some aspects, determining the set of pixels corresponding to the set of patterns on the second device includes detecting, based on the one or more images captured by the at least one image sensor system, each pattern from the set of patterns on the second device; and identifying one or more points in each pattern from the set of patterns, the one or more points corresponding to one or more pixels from the set of pixels, wherein determining the location and relative pose in space of each pattern is based on the one or more points in each pattern.

In some aspects, determining the set of pixels corresponding to the set of patterns on the second device can include detecting, based on the one or more images captured by the at least one image sensor system, each pattern from the set of patterns on the second device; for each pattern, detecting a smaller inner pattern; and identifying one or more points in each smaller inner pattern, the one or more points corresponding to one or more pixels from the set of pixels, wherein determining the location and relative pose in space of each pattern is based on the one or more points in each smaller inner pattern.

In some examples, determining the pose of the first device (or apparatus) relative to the second device includes determining a 6DoF pose of the first device (or apparatus) relative to the second device and a 6DoF pose of the second device relative to the first device (or apparatus). In some aspects, the method, apparatuses, and non-transitory computer-readable storage medium described above can include detecting, based on one or more additional images captured by the at least one image sensor system, one or more additional patterns on an object captured in the one or more additional images; determining one or more pixels in the one or more additional images that correspond to the one or more additional patterns on the object; and determining, based on the one or more pixels, an additional 6DoF pose of the object relative to at least one of the 6DoF pose of the first device (or apparatus) and the 6DoF pose of the second device. In some examples, the object can include a wall, a display device, a video game console, a piece of furniture, an appliance, or a household item.

In some aspects, the apparatuses described above can include one or more sensors. In some aspects, the apparatuses described above can include a mobile device. In some examples, the apparatuses described above can include a hand controller, a mobile phone, a wearable device, a display device, a mobile computer, a head-mounted device, and/or a camera.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

In order to describe the manner in which the various advantages and features of the disclosure can be obtained, a more particular description of the principles described above will be rendered by reference to specific embodiments thereof, which are illustrated in the appended drawings. Understanding that these drawings depict only example embodiments of the disclosure and are not to be considered to limit its scope, the principles herein are described and explained with additional specificity and detail through the use of the drawings in which.

DETAILED DESCRIPTION

Figure 1:
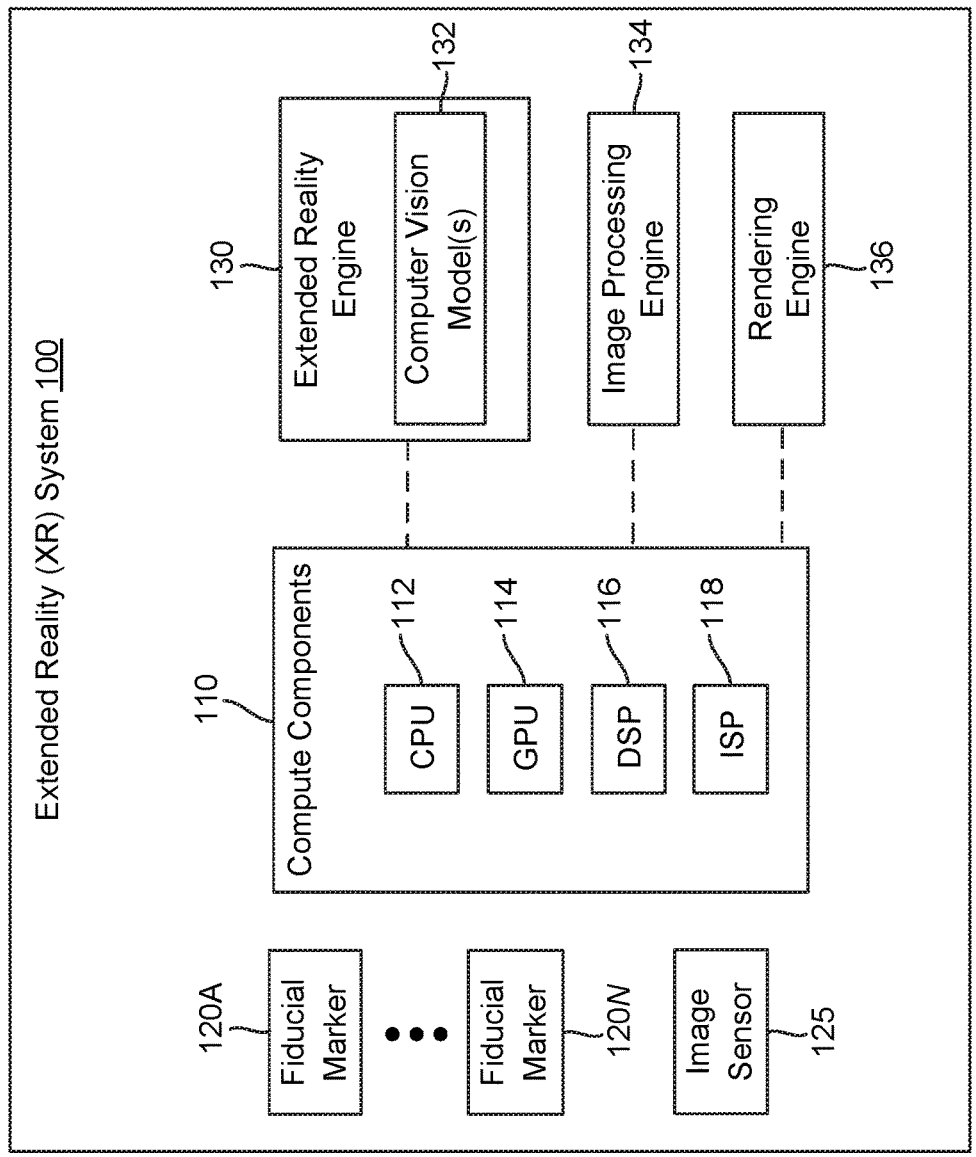
FIG. 1 is a simplified block diagram illustrating an example environment for lower-power visual tracking, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As previously mentioned, the computational complexity of pose estimation systems can impose significant power and resource demands, and can be a limiting factor in various applications. The computational complexity of pose estimation can also limit the performance and scalability of tracking and localization applications that rely on pose information. For example, the computational complexity of visual and inertial tracking, localization and pose estimation algorithms can impose large power and resource demands on devices used in applications that involve tracking, localization and pose estimation, such as extended reality (e.g., virtual reality, augmented reality, mixed reality, etc.), gaming, and robotics. Such power and resource demands are exacerbated by recent trends towards implementing such technologies in mobile and wearable devices, and making such devices smaller, lighter and more comfortable (e.g., by reducing the heat emitted by the device) to wear for longer periods of time.

To illustrate, extended reality (XR) devices, such as headsets (e.g., head-mounted displays (HMDs), smart glasses, etc.), generally rely on higher-power components to track their pose (e.g., their relative three-dimensional (3D) position and orientation) with respect to other items (e.g., other devices, objects, humans, obstacles, etc.). Such tracking can include 6 degree-of-freedom (DoF) tracking, which involves tracking translational movement (e.g., forward/backward or surge, up/down or heave, and left/right or sway) and rotational movement (e.g., pitch, yaw, and roll) along the x, y, and z axes, and can be computationally intense. Moreover, the higher-power components used for 6DoF tracking can include, for example, high-resolution cameras, higher-power processors, and bright light-emitting diode (LED) illuminators in the visible and/or infrared (IR) spectrum.

The higher-power consumption and computational intensity of 6DoF tracking can limit the battery life of devices used in 6DoF tracking applications. In addition, higher-power consumption devices used in 6DoF applications, including XR devices such as headsets, generally consume more power than auxiliary devices, such as hand controllers used in conjunction with the higher-power consumption devices. This is due at least in part to the display and graphics computations typically performed by the higher-power consumption devices. As a result, the battery of the higher-power consumption devices is often drained faster than the battery of their auxiliary devices.

The present disclosure describes systems, methods, and computer-readable media for lower power visual tracking in XR and other applications. The lower power visual tracking technologies herein can reduce the battery consumption and increase the battery life of devices used in 6DoF tracking applications, such as XR devices. In some examples, the technologies herein can offload some or all of the 6DoF tracking tasks typically performed by higher-power consumption devices to auxiliary devices used with the higher-power consumption devices. The auxiliary devices can leverage low power vision/camera and processing components to perform 6DoF tracking tasks at a lower power consumption rate, thereby increasing the battery life of the higher-power consumption devices which is generally drained much faster than the battery life of auxiliary devices.

For example, in some cases, rather than using a higher-powered LED component on the auxiliary device and high-resolution cameras on the higher-power consumption device to compute the relative pose of the auxiliary and higher-power consumption devices, the auxiliary device can implement lower-power cameras to perform 6DoF tracking and offload the associated power consumption from the higher-power consumption device. The higher-power consumption device can implement unique patterns printed on the device, which the lower-power cameras on the auxiliary device can use to identify the relative pose of the auxiliary and higher-power consumption devices. The auxiliary device can leverage the lower power capabilities and hardware accelerated object detection frameworks of the lower-power cameras to detect the unique patterns printed on the higher-power consumption device.

The auxiliary device can use the unique patterns on the higher-power consumption device as fiducial markers for 6DoF tracking. For example, the lower-power cameras on the auxiliary device can use the detected patterns as fiducial markers for identifying the relative pose of the auxiliary and higher-power consumption devices. In some cases, the auxiliary device can perform 3D triangulation of a sparse set of fiducial points detected from the unique patterns in the higher-power consumption device, to identify the relative pose of the auxiliary and higher-power consumption devices. The auxiliary device can thereby identify the relative pose of the auxiliary and higher-power consumption devices at a lower-power consumption rate and reduce the power usage of the higher-power consumption device. In some examples, the 6DoF tracking can be performed entirely (or almost entirely) at the auxiliary device, thus limiting the amount of information transmitted between the auxiliary and higher-power consumption devices and consequently reducing transmission costs and bandwidth requirements.

The lower-power visual tracking technologies herein can be implemented in various use cases and applications. For example, the lower-power visual tracking technologies can be implemented in XR applications, robotic applications, autonomous system applications, gaming applications, etc. To illustrate, in some examples, the lower-power visual tracking technologies can be implemented by autonomous robotic vacuum cleaners to perform path planning and localization based on relative pose calculations; autonomous vehicles to achieve higher tracking, mapping and planning performance in real time (or near real time); game controllers connected to television-based consoles; hand controllers connected to head-mounted displays (HMDs); etc.

In one non-limiting, illustrative example, the lower-power visual tracking technologies can be implemented in 6DoF or 3DoF XR applications. The term extended reality (XR) can encompass augmented reality (AR), virtual reality (VR), mixed reality (MR), and the like. Each of these forms of XR allows users to experience or interact with immersive virtual environments or content. To provide realistic XR experiences, XR technologies generally aim to integrate virtual content with the physical world, and often involve matching the relative pose and movement of objects and devices. This can involve calculating the relative pose of devices, objects, and/or maps of the real-world environment in order to match the relative position and movement of the devices, objects, and/or the real-world environment, and anchor content to the real-world environment in a convincing manner. The relative pose information can be used to match virtual content with the user's perceived motion and the spatio-temporal state of the devices, objects, and real-world environment.

As follows, the lower-power visual tracking technologies herein will be described in the context of XR. However, it should be noted that, as previously explained, the lower-power visual tracking technologies herein can be implemented in a wide variety of other applications such as, for example, robotic applications, autonomous driving or navigation applications, gaming systems and controllers, and so forth. Accordingly, XR is provided throughout for explanation purposes as a non-limiting example application of the lower-power visual tracking technologies herein.

Figure 7:
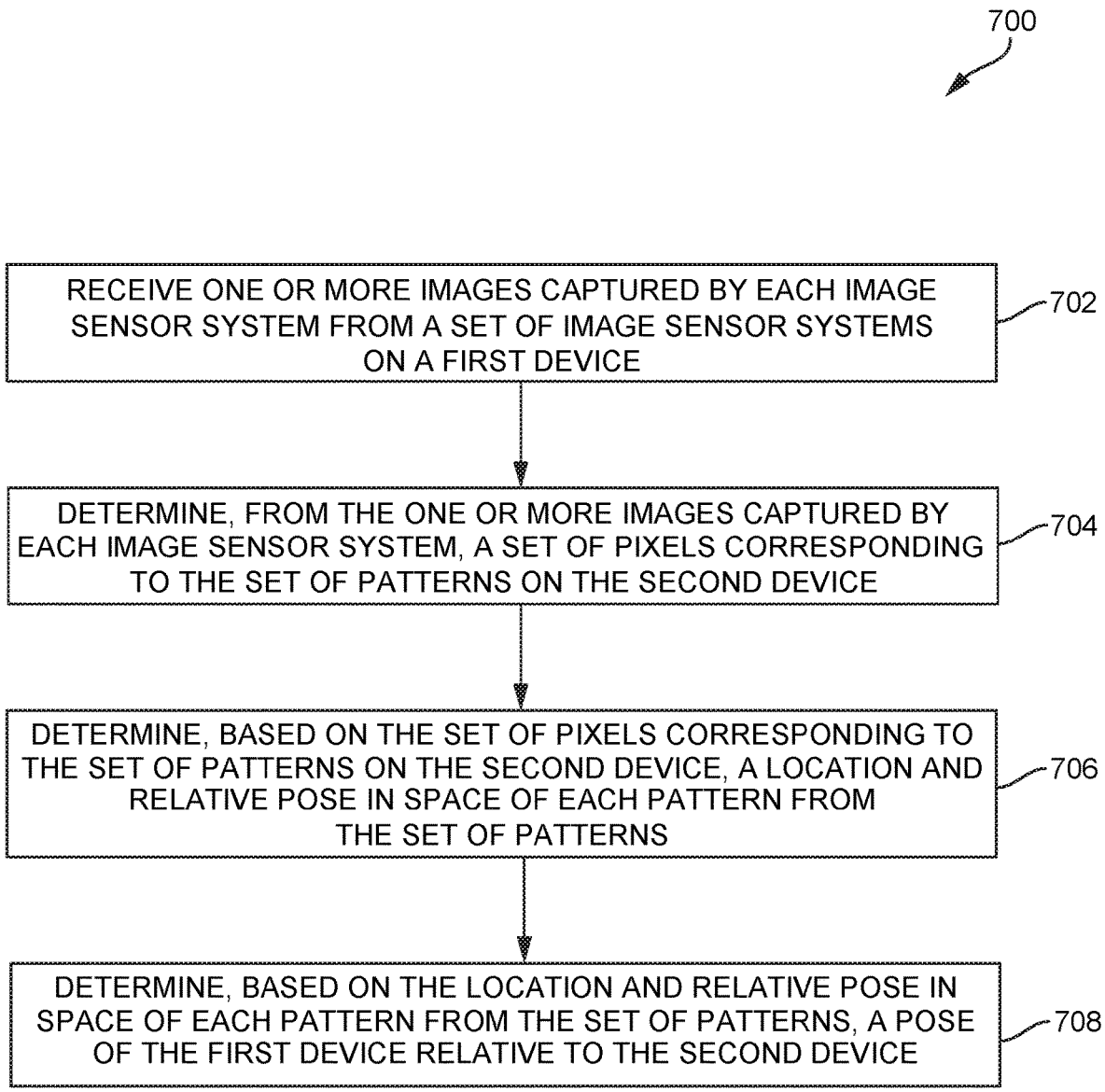
FIG. 7 is a flowchart illustrating an example method for estimating the relative pose of an auxiliary system and a main processing system, in accordance with some examples of the present disclosure.
Figure 8:
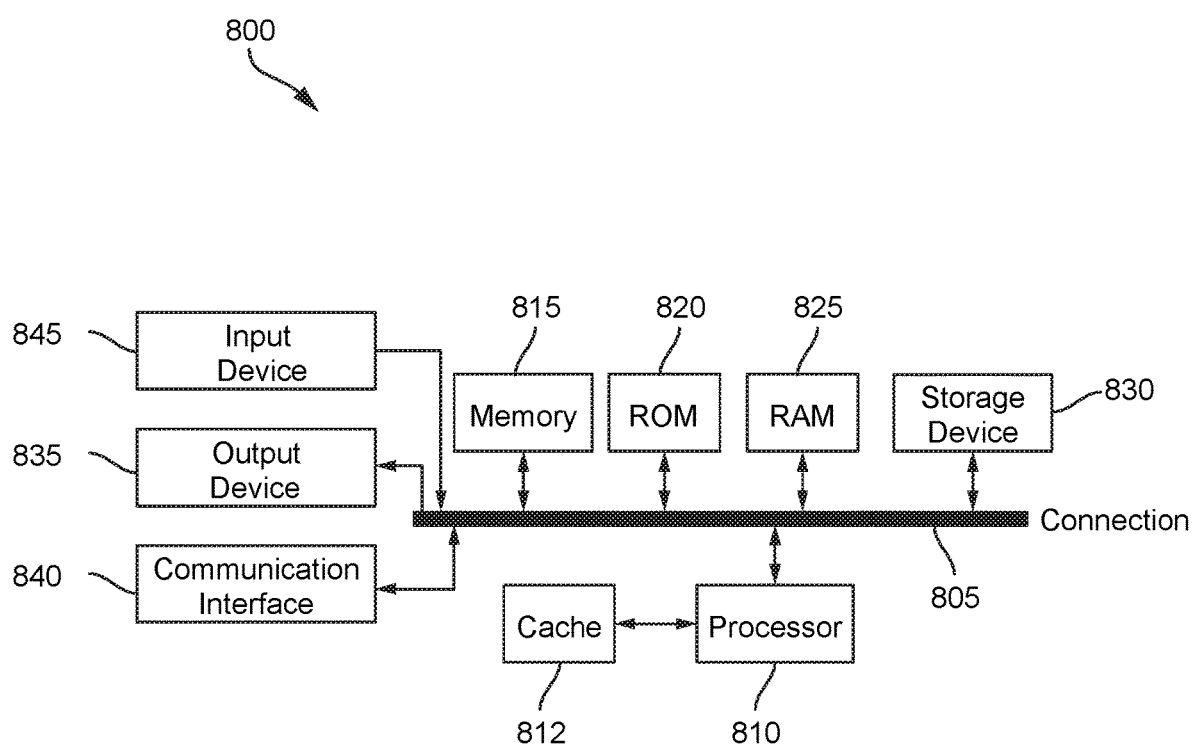
FIG. 8 illustrates an example computing device architecture, in accordance with some examples of the present disclosure.

The present technologies will be described in the following disclosure as follows. The discussion begins with a description of example systems and technologies for providing lower-power visual tracking and pose estimation, as illustrated in FIGS. 1 through 6. A description of an example method for providing lower-power visual tracking and pose estimation, as illustrated in FIG. 7, will then follow. The discussion concludes with a description of an example computing device architecture including example hardware components suitable for performing lower-power visual tracking and associated operations, as illustrated in FIG. 8. The disclosure now turns to FIG. 1

FIG. 1 is a diagram illustrating an example environment for lower-power visual tracking. In this example, the environment can include a main processing system 100 and an auxiliary system 150. In some cases, the main processing system 100 can include a higher-power consumption system that includes higher-power components and/or implements higher-power and/or complexity operations, and the auxiliary system 150 can include a lower-power consumption system that includes lower-power components and/or implements lower-power and/or complexity operations.

In some cases, the main processing system 100 and the auxiliary system 150 can include separate devices used to integrate relative pose information (e.g., the positions and orientations of the main processing system 100 and the auxiliary system 150 relative to each other) for a visual tracking application(s) or use case(s). For example, the main processing system 100 and the auxiliary system 150 can include separate devices that are used in combination in a visual tracking application to provide one or more functionalities that leverage the relative poses of the main processing system 100 and the auxiliary system 150. The visual tracking application can include, for example and without limitation, an XR application, a robotic application, an autonomous driving or navigation application, a gaming application, etc.

In some examples, the main processing system 100 can include an electronic device configured to use information about the relative pose of the main processing system 100 and the auxiliary system 150 to provide one or more functionalities, such as XR functionalities, gaming functionalities, autonomous driving or navigation functionalities, computer vision functionalities, robotic functions, etc. For example, in some cases, the main processing system 100 can be an XR device (e.g., a head-mounted display, a heads-up display device, smart glasses, a smart television system, etc.) and/or a gaming console, and the auxiliary system 150 can be a controller (e.g., a hand controller, a remote controller, an input device, an external control device, etc.) used to interact with the main processing system 100 and/or content provided by the main processing system 100.

As another example, in some cases, the main processing system 100 can be a robotic device (e.g., a robot, an autonomous system, a robotic tool or component, etc.) and the auxiliary system 150 can be an external device (e.g., a controller, a tracking node, etc.) used to generate visual tracking information implemented by the main processing system 100. For illustrative and explanation purposes, the main processing system 100 and the auxiliary system 150 will be described in the following disclosure as an XR device and a hand controller, respectively. However, as noted above, in other examples, the main processing system 100 and the auxiliary system 150 can include other types of devices.

In the illustrative example shown in FIG. 1, the main processing system 100 can include one or more compute components 110, fiducial markers 120A-N (collectively "120"), an image sensor 125, an extended reality engine 130, one or more computer vision models 132, an image processing engine 134, and a rendering engine 136. In some examples, the main processing system 100 can also include other sensors and/or components such as, for example and without limitation, a gyroscope, an accelerometer, an inertial measurement unit (IMU), a radar, a light detection and ranging (LIDAR) sensor, an audio sensor, a light-emitting diode (LED) device, a storage device, a cache, a communications interface, a display, a memory device, etc.

Moreover, in the illustrative example shown in FIG. 1, the auxiliary system 150 can include image sensor systems 152, an accelerometer 154, a gyroscope, tracking engines 158, and networks 160. In some examples, the auxiliary system 150 can also include other sensors and/or components such as, for example and without limitation, an IMU, a radar, a LIDAR, an audio sensor, an LED device, a storage device, a cache, a communications interface, a memory device, etc. An example architecture and example hardware components that can be implemented by the main processing system 100 and/or the auxiliary system 150 are further described below with respect to FIG. 8. It should be noted that the components shown in FIG. 1 with respect to the main processing system 100 and the auxiliary system 150 are merely illustrative examples provided for explanation purposes and, in other examples, the main processing system 100 and/or the auxiliary system 150 can include more or less components than those shown in FIG. 1.

The main processing system 100 can be part of, or implemented by, a single computing device or multiple computing devices. In some examples, the main processing system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a laptop or notebook computer, a tablet computer, a set-top box, a smart television, a display device, a gaming console, an XR device such as an HMD, a drone, a computer in a vehicle, an IoT (Internet-of-Things) device, a smart wearable device, or any other suitable electronic device(s). In some implementations, the one or more compute components 110, the fiducial markers 120, the image sensor 125, the extended reality engine 130, the one or more computer vision models 132, the image processing engine 134, and the rendering engine 136 can be part of the same computing device.

For example, in some cases, the one or more compute components 110, the fiducial markers 120, the image sensor 125, the extended reality engine 130, the one or more computer vision models 132, the image processing engine 134, and the rendering engine 136 can be integrated into a camera system, a smartphone, a laptop, a tablet computer, a smart wearable device, an XR device such as an HMD, an IoT device, a gaming system, and/or any other computing device. However, in some implementations, one or more of the compute components 110, the fiducial markers 120, the image sensor 125, the extended reality engine 130, the one or more computer vision models 132, the image processing engine 134, and/or the rendering engine 136 can be part of, or implemented by, two or more separate computing devices.

Similarly, the auxiliary system 150 can be part of, or implemented by, a single computing device or multiple computing devices. In some examples, the auxiliary system 150 can be part of an electronic device (or devices) such as a smartphone, a laptop or notebook computer, a tablet computer, a controller (e.g., a hand controller, a remote controller, an external control device, an input device, etc.), an IoT device, a smart wearable device, or any other suitable electronic device(s). In some implementations, the image sensor systems 152, the accelerometer 154, the gyroscope 156, the tracking engines 158, and the computer vision models 160 can be part of the same computing device.

For example, in some cases, the image sensor systems 152, the accelerometer 154, the gyroscope 156, the tracking engines 158, and the computer vision models 160 can be integrated into a controller, a smartphone, a laptop, a tablet computer, a smart wearable device, an IoT device, and/or any other computing device. However, in some implementations, one or more of the image sensor systems 152, the accelerometer 154, the gyroscope, the tracking engines 158, and/or the one or more computer vision models 160 can be part of, or implemented by, two or more separate devices.

The one or more compute components 110 of the main processing system 100 can include, for example and without limitation, a central processing unit (CPU) 112, a graphics processing unit (GPU) 114, a digital signal processor (DSP) 116, and/or an image signal processor (ISP) 118. The main processing system 100 can use the one or more compute components 110 to perform various computing operations such as, for example, extended reality operations (e.g., tracking, localization, pose estimation, mapping, content anchoring, content rendering, etc.), image/video processing, graphics rendering, machine learning, data processing, modeling, calculations, and/or any other operations. In the example shown in FIG. 1, the one or more compute components 110 implement the extended reality (XR) engine 130, an image processing engine 134, and a rendering engine 136. In other examples, the one or more compute components 110 can also implement one or more other processing engines. Moreover, the XR engine 130 can implement one or more computer vision models 132 configured to perform XR operations such as tracking, localization, pose estimation, mapping, content anchoring, etc.

The operations of the XR engine 130, the one or more computer vision models 132, the image processing engine 134, and the rendering engine 136 (and any other processing engines) can be implemented by any of the compute components in the one or more compute components 110. In one illustrative example, the operations of the rendering engine 136 can be implemented by the GPU 114, and the operations of the XR engine 130, the one or more computer vision models 132, the image processing engine 134, and/or one or more other processing engines can be implemented by the CPU 112, the DSP 116, and/or the ISP 118. In some examples, the operations of the XR engine 130, the one or more computer vision models 132, and the image processing engine 134 can be implemented by the ISP 118. In other examples, the operations of the XR engine 130, the one or more computer vision models 132, and/or the image processing engine 134 can be implemented by the CPU 112, the DSP 116, the ISP 118, and/or a combination of the CPU 112, the DSP 116, and the ISP 118.

In some cases, the one or more compute components 110 can include other electronic circuits or hardware, computer software, firmware, or any combination thereof, to perform any of the various operations described herein. Moreover, in some examples, the one or more compute components 110 can include more or less compute components than those shown in FIG. 1. Indeed, the CPU 112, the GPU 114, the DSP 116, and the ISP 118 are merely illustrative examples provided for explanation purposes.

The main processing system 100 can include fiducial markers 120A through 120N (collectively "120") printed, displayed, etched, configured, attached, and/or provided on an exterior/outside of the main processing system 100. In some cases, the fiducial markers 120 can be positioned on the main processing system 100 at certain known locations and/or distances relative to each other. In some cases, the fiducial markers 120 can have one or more of the same or different predetermined sizes, shapes and/or configurations. The number, relative locations, relative distances, sizes, shapes, and/or configurations of the fiducial markers 120 can vary in different examples, as further described below. Moreover, the fiducial markers 120 can include patterns, codes, encoded data, and/or objects that can be detected and analyzed by the image sensors 152 on the auxiliary system 150 to identify pose information, as further described below. In some cases, the fiducial markers 120 can be visible in the visible and/or infrared spectrum.

The fiducial markers 120 can include specific patterns directly on the main processing system 100 or on an object or material on (e.g., attached, pasted, provided, etc.) on the main processing system 100. For example, in some cases, the fiducial markers 120 can include stickers (or sticking elements or materials) with patterns. As another example, the fiducial markers 120 can include patterns etched, designed, overlaid, or printed on the main processing system 100. As another example, the fiducial markers 120 can include films, objects, overlays, or materials with patterns.

The image sensor 125 can include any image and/or video sensor or capturing device, such as a digital camera sensor, a video camera sensor, a smartphone camera sensor, an image/video capture device on an electronic apparatus such as a television or computer, a camera, etc. In some cases, the image sensor 125 can be part of a camera or computing device such as a digital camera, a video camera, an IP camera, a smartphone, a smart television, a game system, etc. Moreover, in some cases, the image sensor 125 can include multiple image sensors, such as rear and front sensor devices, and can be part of a dual-camera or other multi-camera assembly (e.g., including two camera, three cameras, four cameras, or other number of cameras).

In some examples, the image sensor 125 can represent or include one or more low-power image sensor systems, such as image sensor systems 152 described below with respect to the auxiliary system 150. The image sensor 125 can capture image and/or video data (e.g., raw image and/or video data), which can be processed by the image sensor 125, the one or more compute components 110, and/or one or more other components. In some cases, the image sensor 125 can detect or recognize patterns or encoded information in objects, as further described below with respect to the image sensor systems 152 on the auxiliary system 150.

In some examples, the image sensor 125 can capture image data and generate frames based on the image data and/or provide the image data or frames to the XR engine 130, the image processing engine 134 and/or the rendering engine 136 for processing. A frame can include a video frame of a video sequence or a still image. A frame can include a pixel array representing a scene. For example, a frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color or monochrome picture.

In some examples, the XR engine 130 and/or the one or more computer vision models 132 can perform XR processing operations based on data from the image sensor 125, the image sensor systems 152, the accelerometer 154, the gyroscope 156, the tracking engines 158, and/or one or more sensors on the main processing system 100, such as one or more IMUs, accelerometers, gyroscopes, etc. For example, in some cases, the XR engine 130 and/or the one or more computer vision models 132 can perform tracking, localization, pose estimation, mapping, and/or content anchoring operations.

In some examples, the image processing engine 134 can perform image processing operations based on data from the image sensor 125 and/or the image sensor systems 152. In some cases, the image processing engine 134 can perform image processing operations such as, for example, filtering, demosaicing, scaling, color correction, color conversion, segmentation, noise reduction filtering, spatial filtering, artifact correction, etc. The rendering engine 136 can obtain image data generated and/or processed by the compute components 110, the image sensor 125, the XR engine 130, the one or more computer vision models 132, and/or the image processing engine 134 and render video and/or image frames for presentation on a display device.

In some cases, the image sensor systems 152 on the auxiliary system 150 can include low power imaging systems or always-on computer vision camera systems. For example, each image sensor systems can include an image sensor and one or more low-power processors for processing image data captured by the image sensor. In some cases, each image sensor system can include one or more image processing, computer-vision, and/or other processing algorithms. For example, in some cases, the image sensor systems 152 can include or implement the tracking engines 158 and/or the computer vision models 160 and perform pose estimation as further described herein. As further described herein, in some examples, the image sensor systems 152 can detect the fiducial markers 120 on the main processing system 100 and estimate a relative pose of the auxiliary system 150 and the main processing system 100 based on the detected fiducial markers 120.

The tracking engines 158 can implement one or more algorithms for tracking and estimating a relative pose of the auxiliary system 150 and the main processing system 100. In some examples, the tracking engines 158 can receive image data captured by the image sensor systems 152 and perform pose estimation based on the received image data to calculate a relative pose of the auxiliary system 150 and the main processing system 100. In some cases, the tracking engines 158 can implement the computer vision models 160 to calculate the relative pose of the auxiliary system 150 and the main processing system 100. In some examples, the tracking engines 158 and/or the computer vision models 160 can be implemented by the image sensor systems 152. For example, each image sensor system can implement a tracking engine and a computer vision model for performing pose estimation as described herein. In other examples, the tracking engines 158 and/or computer vision models 160 can be implemented by the auxiliary system 150 separate from the image sensor systems 152.

The accelerometer 154 can detect acceleration by the auxiliary system 150 and generate acceleration measurements based on the detected acceleration. The gyroscope 156 can detect and measure the orientation and angular velocity of the auxiliary system 150. For example, the gyroscope 156 can be used to measure the pitch, roll, and yaw of the auxiliary system 150. In some examples, the image sensor systems 152 and/or the tracking engines 158 can use measurements obtained by the accelerometer 154 and the gyroscope 156 to calculate the relative pose of the auxiliary system 150 and the main processing system 100, as further described herein. For example, the image sensor systems 152 can detect the position of the fiducial markers 120 and the main processing system 100, and the image sensor systems 152 and/or the tracking engines 158 can use the detected positions of the fiducial markers 120 and measurements from the accelerometer 154 and the gyroscope 156 to calculate the pose of the auxiliary system 150 relative to the main processing system 100.

While the main processing system 100 and the auxiliary system 150 are shown to include certain components, one of ordinary skill will appreciate that the main processing system 100 and the auxiliary system 150 can include more or fewer components than those shown in FIG. 1. For example, the main processing system 100 and/or the auxiliary system 150 can also include, in some instances, one or more other memory devices (e.g., RAM, ROM, cache, and/or the like), one or more networking interfaces (e.g., wired and/or wireless communications interfaces and the like), one or more display devices, caches, storage devices, and/or other hardware or processing devices that are not shown in FIG. 1. An illustrative example of a computing device and hardware components that can be implemented with the main processing system 100 and/or the auxiliary system 150 described below with respect to FIG. 8.

Figure 2:
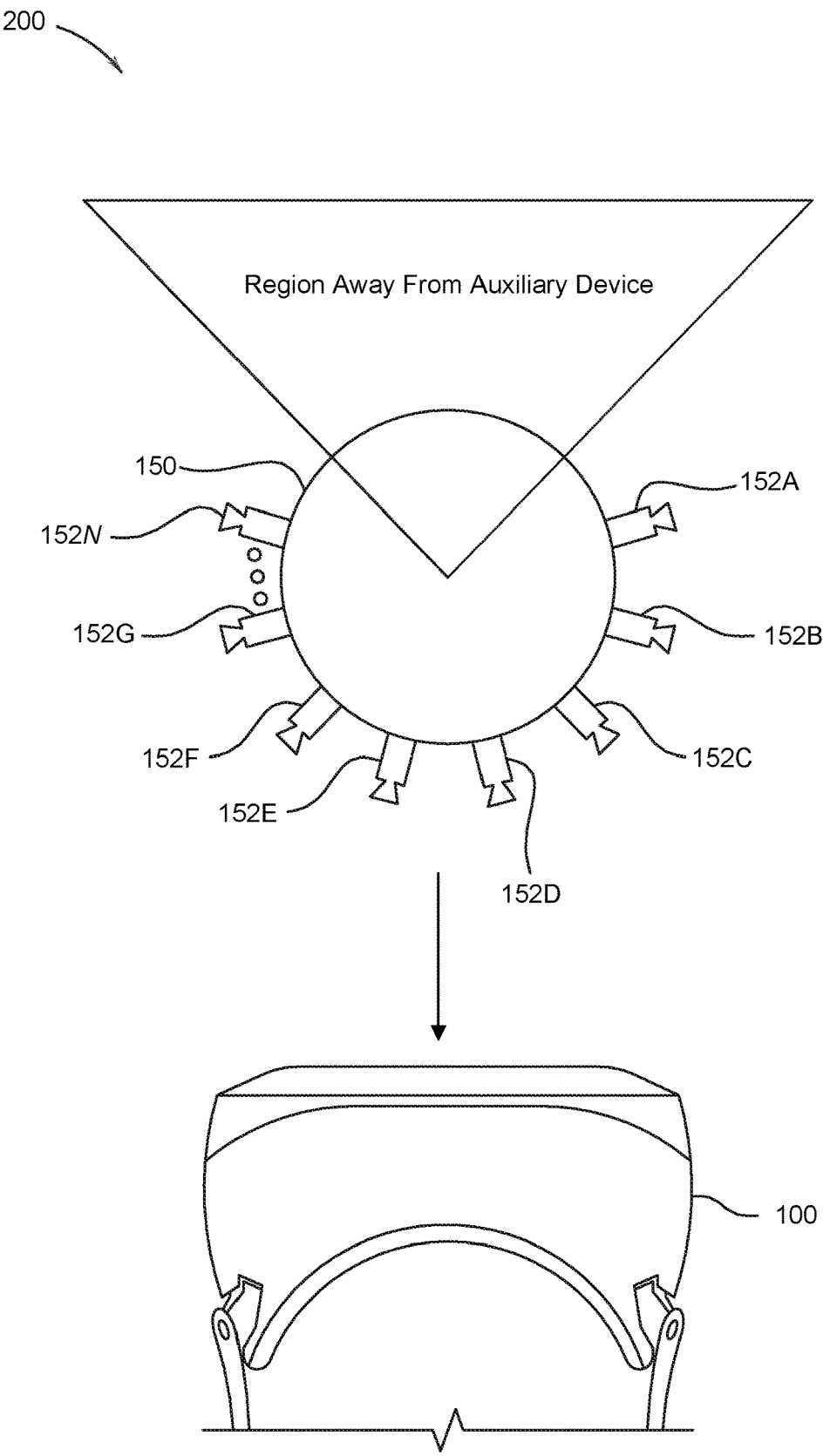
FIG. 2 illustrates an example view of an auxiliary system and a main processing system in an example use case for using image sensor systems on the auxiliary system to detect a pose of the auxiliary system relative to the main processing system, in accordance with some examples of the present disclosure.

FIG. 2 illustrates an example view 200 of the auxiliary system 150 and the main processing system 100 in an example use case for using the image sensor systems 152 on the auxiliary system 150 to detect a pose of the auxiliary system 150 relative to the main processing system 100. In this example, the auxiliary system 150 represents a hand controller, such as a ring controller, used in combination with the main processing system 100 to provide XR experiences. Moreover, in this example, the main processing system 100 represents a wearable XR device such as an HMD. However, it should be noted that a hand controller and a wearable device are used herein as illustrative examples used for explanation purposes and, in other examples, the auxiliary system 150 and/or the main processing system 100 can include or represent other devices such as, for example, other types of controllers, a gaming system, a smart wearable device, an IoT device, a sensor system, a smart television, etc.

Similarly, for illustrative and explanation purposes, the auxiliary system 150 and the main processing system 100 described herein with respect to FIGS. 3A through 7 will be described in the following disclosure as including or representing an example hand controller and an example wearable XR device (e.g., an HMD), respectively. However, it should be noted that a hand controller and a wearable XR device are merely illustrative examples used for explanation purposes and, in other examples, the auxiliary system 150 and/or the main processing system 100 described herein with respect to FIGS. 3A through 7 can include or represent other devices such as, for example, other types of controllers, a gaming system, a smart wearable device, an IoT device, a sensor system, a smart television, etc.

As illustrated, the auxiliary system 150 can include image sensor systems 152A-152N (collectively "152"), which can be used to detect fiducial markers (e.g., 120) on the main processing system 100 when the fiducial markers are within a field-of-view (FoV) of the image sensor systems 152. The auxiliary system 150 can use the image sensor systems 152A-152N to detect the fiducial markers, identify the relative positions of one or more of the fiducial markers and use such information to estimate the pose of the auxiliary system 150 relative to the main processing system 100.

For example, when a fiducial marker is within a FoV of at least one image sensor system (e.g., image sensor systems 152A, 152B, 152C, 152D, 152E, 152F, 152G, through 152N), the at least one image sensor system can capture an image of the fiducial marker and use the captured image to detect the location/position of the one or more fiducial marker. Similarly, when multiple fiducial markers are within a FoV of one or more image sensor systems (e.g., image sensor systems 152A, 152B, 152C, 152D, 152E, 152F, 152G, through 152IV), the one or more image sensor systems can capture images of the multiple fiducial markers and use the captured images to detect the relative location/position of the multiple fiducial markers.

In some examples, the image sensor systems 152 and/or the auxiliary system 150 can use the relative location/position of fiducial markers detected on the main processing system 100 to calculate the pose of the auxiliary system 150 relative to the main processing system 100. For example, when fiducial markers on the main processing system 100 are within a FoV of image sensor systems (e.g., image sensor systems 152A, 152B, 152C, 152D, 152E, 152F, 152G, through 1521V) on the auxiliary system 150, those image sensor systems can capture images of the fiducial markers. The auxiliary system 150 and/or image sensor systems can use the captured images to detect the fiducial markers and determine their relative location/position in 3D space. The image sensor systems and/or the auxiliary system 150 can use the relative location/position of the fiducial markers to calculate the pose of the auxiliary system 150 relative to the main processing system 100.

In some examples, when fiducial markers are within a FoV of multiple image sensor systems, the auxiliary system 150 can track a 6DoF state of the auxiliary system 150 relative to the main processing system 100. In some cases, when fiducial markers are within a FoV of only one image sensor system, the auxiliary system 150 can track a subset of the 6DoF state of the auxiliary system 150 relative to the main processing system 100. In some cases, when the fiducial markers are not within a FoV of any image sensor system, the auxiliary system 150 can use the accelerometer 154 and the gyroscope 156 to obtain an inertial measurement of the auxiliary system 150, and use the inertial measurement to track a state of the auxiliary system 150.

By using the image sensor systems 152 on the auxiliary system 150, which can have lower power consumption, to track the pose of the auxiliary system 150 based on the fiducial markers on the main processing system 100, as opposed to using higher power components on the main processing system 100, the pose of the auxiliary system 150 can be tracked with lower power consumption. Thus, such strategies can conserve power of the main processing system 100 which generally has higher power components and therefore higher power demands and/or a more limited battery life.

While the example view 200 illustrates a single auxiliary system 150, it should be noted that other examples may include multiple auxiliary systems. For example, in some cases, two auxiliary systems (e.g., including auxiliary system 150 and another auxiliary system), such as two hand controllers, can be used in combination with the main processing system 100 to track the respective pose of each auxiliary system relative to the main processing system 100. The single auxiliary system 150 is provided herein as merely an illustrative example for explanation purposes.

Figure 3A:
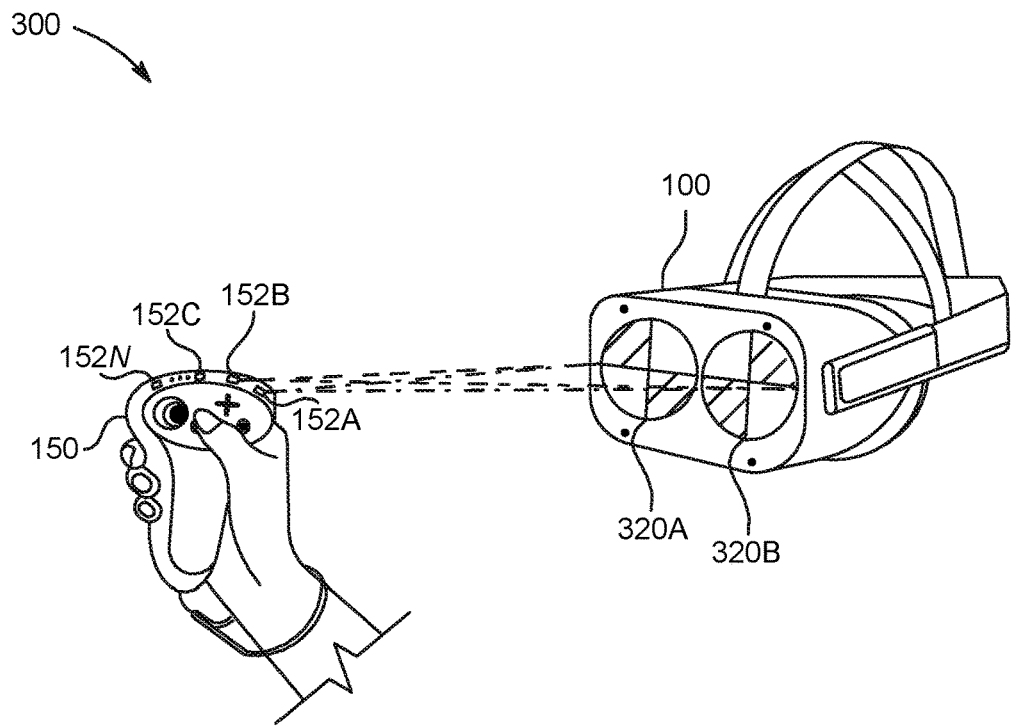
FIG. 3A is a diagram illustrating an example use case for tracking a six degree-of-freedom (6DoF) pose of an auxiliary system and/or a main processing system, in accordance with some examples of the present disclosure.

FIG. 3A is a diagram illustrating an example use case 300 for tracking a 6DoF pose of the auxiliary system 150 and/or the main processing system 100. In this example, fiducial markers 320A and 320B on the main processing system 100 are within a FoV of image sensor systems 152A, 152B, through 152N (where N is a value greater than or equal to 0) and the image sensor systems 152A, 152B, through 152N can capture image data (e.g., one or more images or frames) of the fiducial markers 320A and 320B on the main processing system 100. The image sensor systems 152A, 152B, through 152N and/or the auxiliary system 150 can run object detection to detect the fiducial markers 320A and 320B within the FoV of the image sensor systems 152A, 152B, through 152N.

Each of the fiducial markers 320A and 320B can include a specific pattern(s), which can be detected by the image sensor systems 152A, 152B, through 152N. The detected pattern(s) of the fiducial markers 320A and 320B can be used to identify the position of the fiducial markers 320A and 320B. When both of the image sensor systems 152A, 152B, through 152N detect the same patterns (e.g., the fiducial markers 320A and 320B), the auxiliary system 150 can triangulate the three-dimensional (3D) location of the fiducial markers 320A and 320B. The auxiliary system 150 can use the 3D location of the fiducial markers 120A through 120N and the relative pose of the fiducial markers 320A and 320B to identify the 6DoF pose of the auxiliary system 150 relative to the main processing system 100. In some examples, the auxiliary system 150 can use the 3D location of the fiducial markers 320A and 320B and the relative pose of the fiducial markers 320A and 320B to identify the 6DoF pose of the main processing system 100 relative to the auxiliary system 150.

Moreover, in some examples, the calculated pose information can be more accurate and robust as more fiducial markers are detected and/or as more image sensor systems detect a same fiducial marker(s). For example, if additional image sensor systems were also able to detect one or more of the fiducial markers 320A and 320B and/or if the image sensor systems 152A, 152B, through 152N (and/or additional image sensor systems) were able to detect additional fiducial markers, the auxiliary system 150 can use the additional fiducial marker data to increase the accuracy of the calculated pose information.

In FIG. 3A, the fiducial markers 320A and 320B 0N are printed on a front of the main processing system 100 and shown to have a specific circular configuration. However, it should be noted that other examples can implement a different number, arrangement, shape, size, structure, design, and/or configuration of fiducial markers. For example, in some cases, the main processing system 100 can have more or less fiducial markers printed on the front, top, and/or sides of the main processing system 100, and the fiducial markers can have a same or different shape, size, pattern, structure, design, and/or configuration. In some cases, the fiducial markers printed on the main processing system 100 can be oriented in specific configurations that allow disambiguating left and right positions in case the auxiliary system 150 or the main processing system 100 is twisted upside down or otherwise rotated.

Figure 3B:
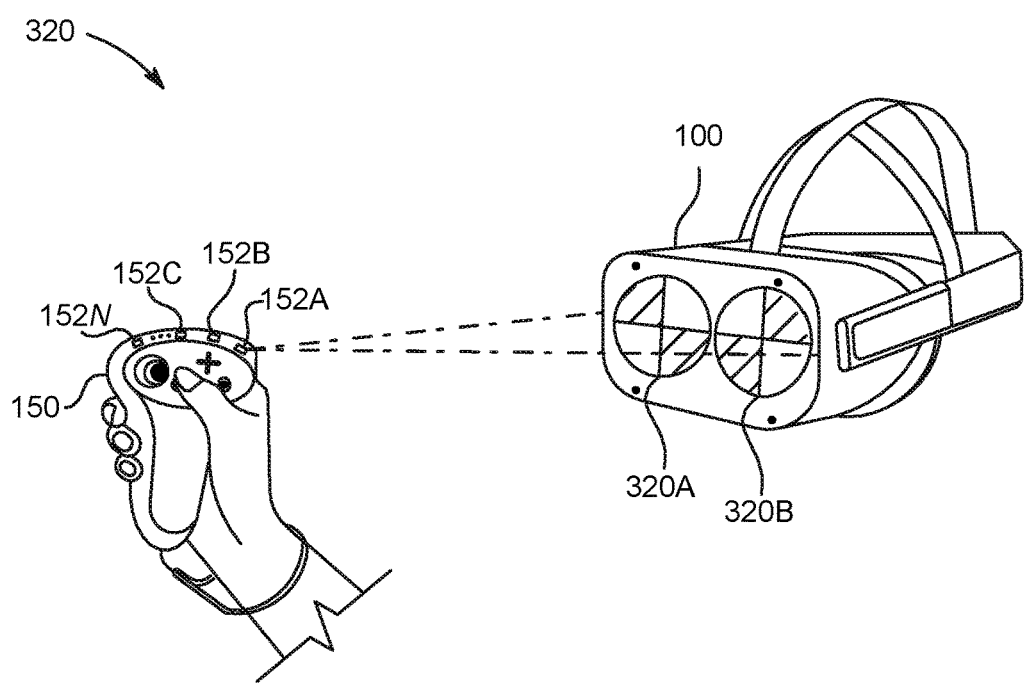
FIG. 3B is a diagram illustrating another example use case for tracking pose information for an auxiliary system 150 and/or a main processing system, in accordance with some examples of the present disclosure.

FIG. 3B is a diagram illustrating another example use case 320 for tracking pose information for the auxiliary system 150 and/or the main processing system 100. In this example, fiducial markers 320A and 320B are only within a FoV of image sensor system 152A. The image sensor system 152A can capture image data (e.g., one or more images or frames) of the fiducial markers 320A and 320B, and the auxiliary system 150 and/or the image sensor system 152A can run object detection to detect the fiducial markers 320A and 320B within the FoV of the image sensor system 152A.

As previously noted, each of the fiducial markers 320A and 320B can include a specific pattern, which can be detected by the image sensor system 152A. When the image sensor system 152A detects the fiducial markers 320A and 320B, the auxiliary system 150 (or the image sensor system 152A) can triangulate the 3D location of the fiducial markers 320A and 320B. The auxiliary system 150 (or the image sensor system 152A) can then use the 3D location of the fiducial markers 320A and 320B and their relative pose to identify at least a portion or subset of the 6DoF state of the auxiliary system 150 relative to the main processing system 100. In some examples, the auxiliary system 150 (or the image sensor system 152A) can similarly use the 3D location of the fiducial markers 320A and 320B and their relative pose to identify at least a portion or subset of the 6DoF state of the main processing system 100 relative to the auxiliary system 150.

Figure 3C:
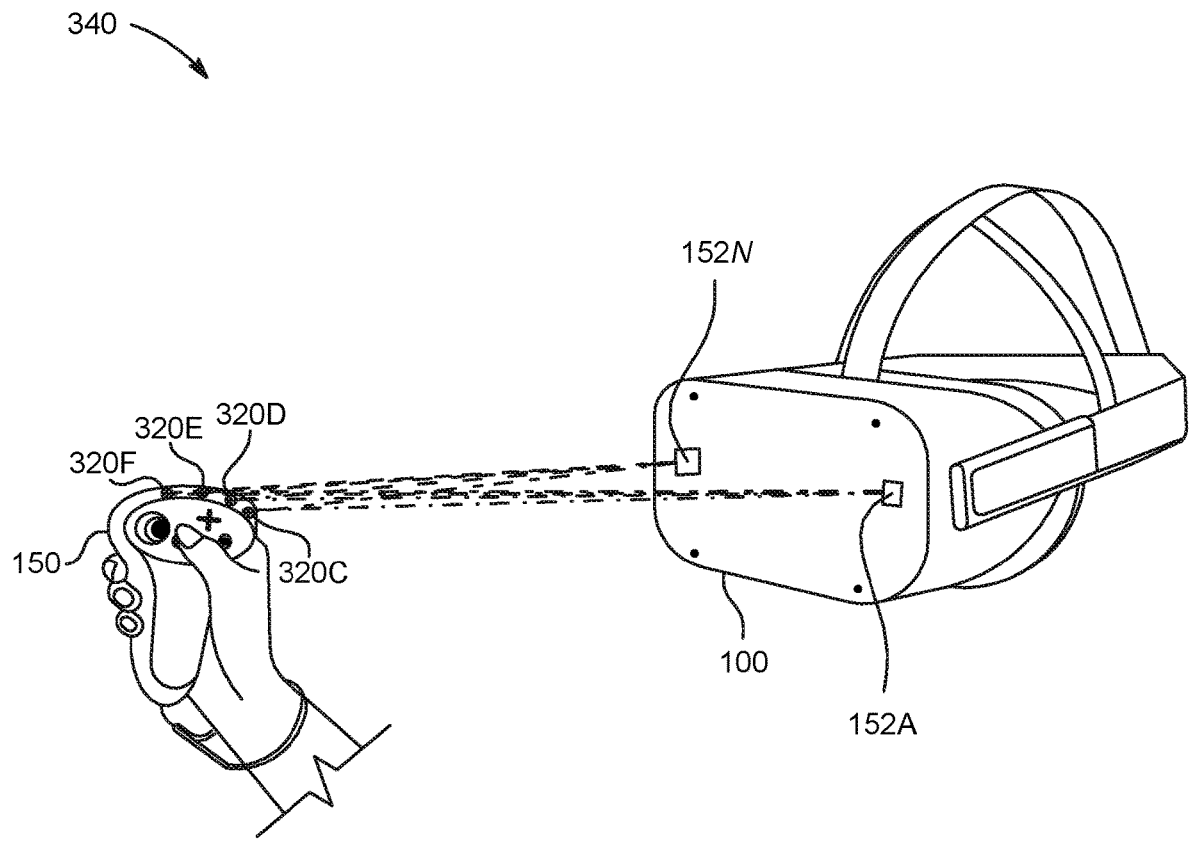
FIG. 3C is a diagram illustrating an example use case for tracking a 6DoF pose of an auxiliary system and/or a main processing system, in accordance with some examples of the present disclosure.

FIG. 3C is a diagram illustrating an example use case 340 for tracking a 6DoF pose of the auxiliary system 150 and/or the main processing system 100. In this example, the fiducial markers 320C through 320F (shown in FIG. 3C as fiducial markers 320C, 320D, 320E, and 320F) are implemented on the auxiliary system 150 and the image sensor systems 152A and 152N are implemented on the main processing system 100. Moreover, the fiducial markers 320C through 320F are within a FoV of the image sensor systems 152A, 152B, through 152N on the main processing system 100. The image sensor systems 152A, 152B, through 152N can capture image data (e.g., one or more images or frames) of the fiducial markers 320C through 320F, and the main processing system 100 and/or the image sensor systems 152A and/or 152B can run object detection to detect the fiducial markers 320C through 320F within the FoV of the image sensor systems 152A, 152B, through 152N.

The image sensor systems 152A, 152B, through 152N can detect the specific patterns depicted in the fiducial markers 320C through 320F to identify the relative locations/positions of the fiducial markers 320C through 320F. When both of the image sensor systems 152A, 152B, through 152N detect the same patterns (e.g., the fiducial markers 320C through 320F), the main processing system 100 can triangulate the 3D location of the fiducial markers 320C through 320F. The main processing system 100 can then use the 3D location of the fiducial markers 320C through 320F and the relative pose of the fiducial markers 320C through 320F to identify the 6DoF pose of the auxiliary system 150 relative to the main processing system 100. In some examples, the main processing system 100 can also use the 3D location of the fiducial markers 320C through 320F and their relative pose to identify the 6DoF pose of the auxiliary system 150 relative to the main processing system 100.

In some cases, the number of fiducial markers on the auxiliary system 150 and the number of image sensor systems on the main processing system 100 that detect the same fiducial marker(s) can impact the accuracy and robustness of the pose information calculated by the main processing system 100, as it can increase or decrease the amount of fiducial data points used to calculate pose information and/or the amount data points correlated to calculate pose information. Moreover, in some cases, the fiducial markers printed on the auxiliary system 150 can be oriented in specific configurations that allow disambiguating left and right positions in case the auxiliary system 150 or the main processing system 100 is twisted upside down or otherwise rotated.

Figure 3D:
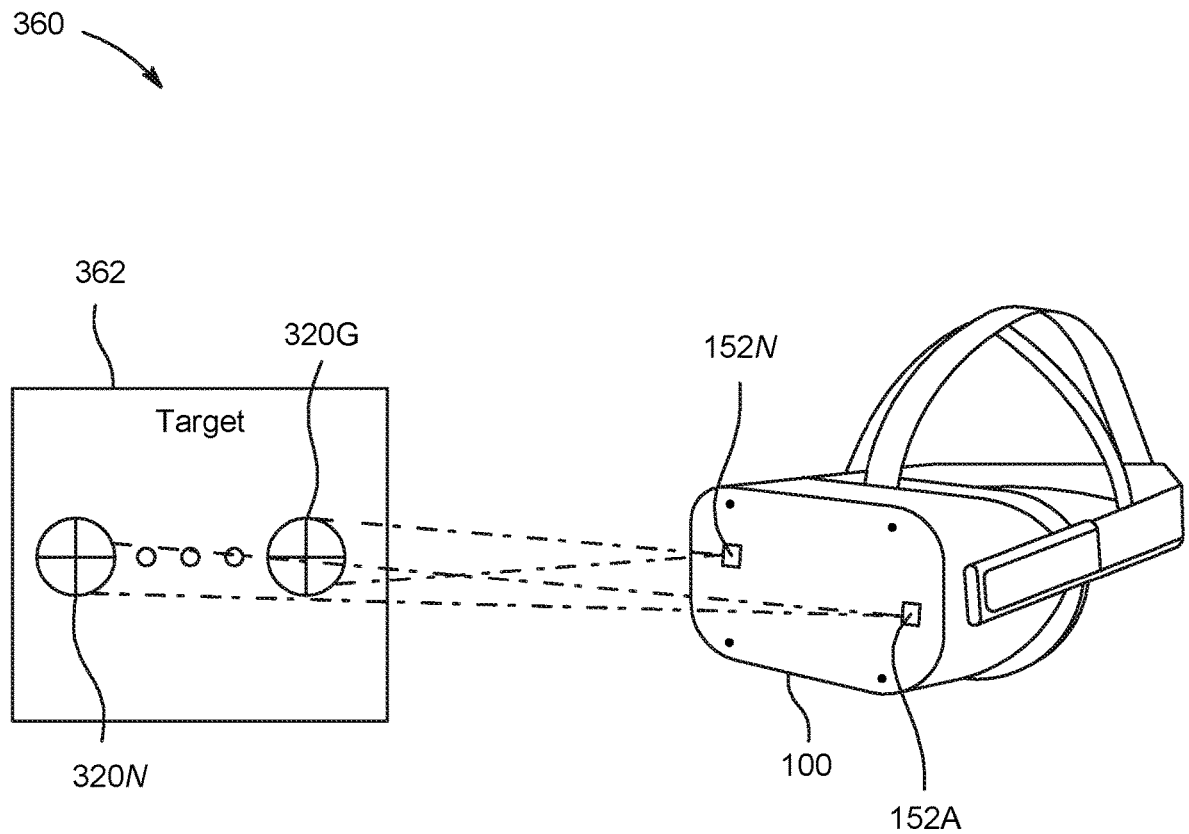
FIG. 3D is a diagram illustrating an example use case for tracking tagged objects based on fiducial markers, in accordance with some examples of the present disclosure.

FIG. 3D is a diagram illustrating an example use case 360 for tracking tagged objects based on fiducial markers 320G and 320N. In this example, fiducial markers 320G and 320N are printed on a target 362 for use in recognizing and tracking the target 362 during an XR experience, a game, or another tracking-based application. In some cases, a user can place or print the fiducial markers 320G and 320N on the target 362. In other cases, the target 362 can be designed with, or implement, the fiducial markers 320G and 320N. For example, the fiducial markers 320G and 320N can be etched, printed, or configured on the target 362 when the target 362 is configured or manufactured.

The target 362 can include any object or item to be tracked. For example, the target 362 can include a gaming console, a television, an environmental object, a piece of furniture, a wall, a door, a computer, a piece of equipment, a device, an appliance, a tool, etc. Moreover, the target 362 can include any number, size, shape, arrangement, structure, design, and/or configuration of fiducial markers.

The fiducial markers 320G and 320N on the target 362 are shown within a FoV of image sensor systems 152A, 152B, through 152N on the main processing system 100. The image sensor systems 152A, 152B, through 152N can capture image data (e.g., one or more images or frames) of the fiducial markers 320G and 320N, and the main processing system 100 and/or the image sensor systems 152A and/or 152B can run object detection to detect the fiducial markers 320G and 320N within the FoV of the image sensor systems 152A, 152B, through 152N.

The image sensor systems 152A, 152B, through 152N can detect specific patterns on the fiducial markers 320G and 320N to identify the position of the fiducial markers 320G and 320N. When both of the image sensor systems 152A, 152B, through 152N detect the same patterns (e.g., the fiducial markers 320G and 320N), the main processing system 100 can triangulate the 3D location of the fiducial markers 320G and 320N. The main processing system 100 can then use the 3D location of the fiducial markers 320G and 320N and the relative pose of the fiducial markers 320G and 320N to identify the 6DoF pose of the target 362 relative to the main processing system 100. In some examples, the main processing system 100 can also use the 3D location of the fiducial markers 320G and 320N and their relative pose to identify the 6DoF pose of the main processing system 100 relative to the target 362.

Figure 4A:
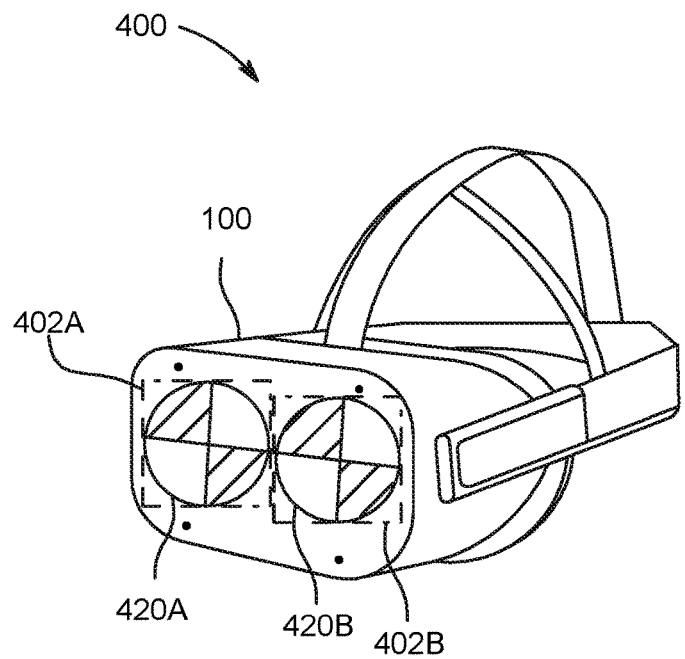
FIGS. 4A-C illustrate example configurations of fiducial markers, in accordance with some examples of the present disclosure.

FIG. 4A illustrates an example configuration 400 of fiducial markers. In this example, the fiducial markers 420A and 420B are shaped as circles with patterns. However, it should be noted that in other examples the fiducial markers 420A and 420B can have any other shapes such as, for example, squares, triangles, rectangles, octagons, etc.

The patterns within the circles can have any shape, configuration, arrangement, characteristic and/or design. Moreover, the patterns within the fiducial markers 420A and 420B (e.g., the circles) can be based on any feature, element, characteristic, or item that is visible in the IR and/or visible light spectrum. For example, the patterns can include colors, lines, letters, symbols, codes, textures, etchings, nonhomogeneities, substances, images, lighting (e.g., in visible light or IR spectrum), back-lighting (e.g., in visible light or IR spectrum), lighting from an external or ambient source (e.g., an IR floodlight in the environment), etc.

The image sensor systems 152 can analyze image data capturing the fiducial markers 420A and 420B, and detect the fiducial markers 420A and 420B within the image data based on the patterns (and/or one or more points in the patterns) of the fiducial markers 420A and 420B. In some examples, the object detection of the image sensor systems 152 can provide bounding boxes 402A and 402B around the fiducial markers 420A and 420B. The bounding boxes 402A and 402B can represent, and/or can be used to, identify the relative positions of the fiducial markers 420A and 420B.

Figure 4B:
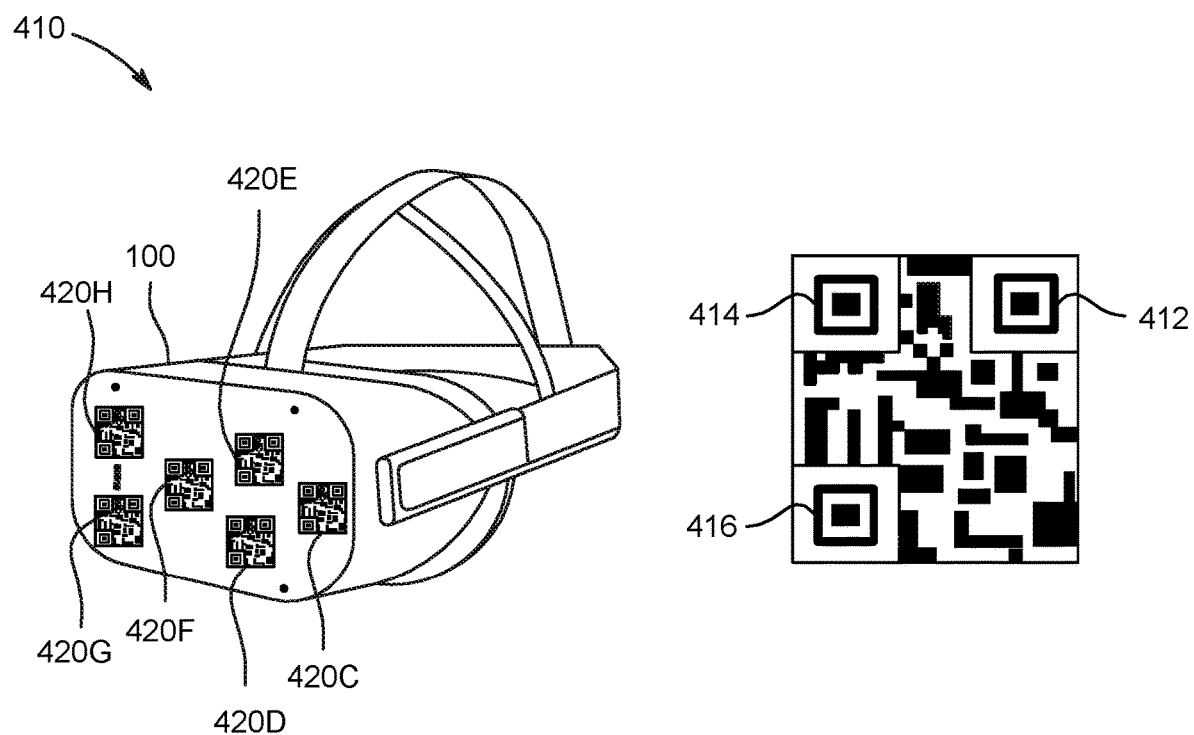

FIG. 4B illustrates another example configuration 410 of fiducial markers. In this example, the fiducial markers 420C through 420G are machine-readable barcodes, such as quick response (QR) codes, with square patterns 412, 414, and 416. Each of the machine-readable barcodes can encode information such as location information, position information (e.g., left versus right, etc.), an identifier, a tracker, user information, device information, game information, XR information, application information, metadata, text, video game information (e.g., player information, gameplay elements, etc.), settings information, and/or any other type of information. For example, the machine-readable barcodes can encode a unique code for each player in a multi-player game setting.

Image sensor systems (e.g., 152) on an auxiliary system (e.g., 150) can detect the fiducial markers to detect their relative positions. In some examples, image sensor systems on an auxiliary system can read the machine-readable barcodes in the fiducial markers 420C through 420G to detect the information encoded in the machine-readable barcodes to determine the position of the fiducial markers and/or any other data from the encoded information. In some examples, the image sensor systems can detect the square patterns 412, 414, and 416 in the fiducial markers 420C through 420G from a farther distance than the machine-readable barcodes to allow the image sensor systems to calculate the position of, and/or information associated with, the fiducial markers even if unable to read the machine-readable barcodes.

Figure 4C:
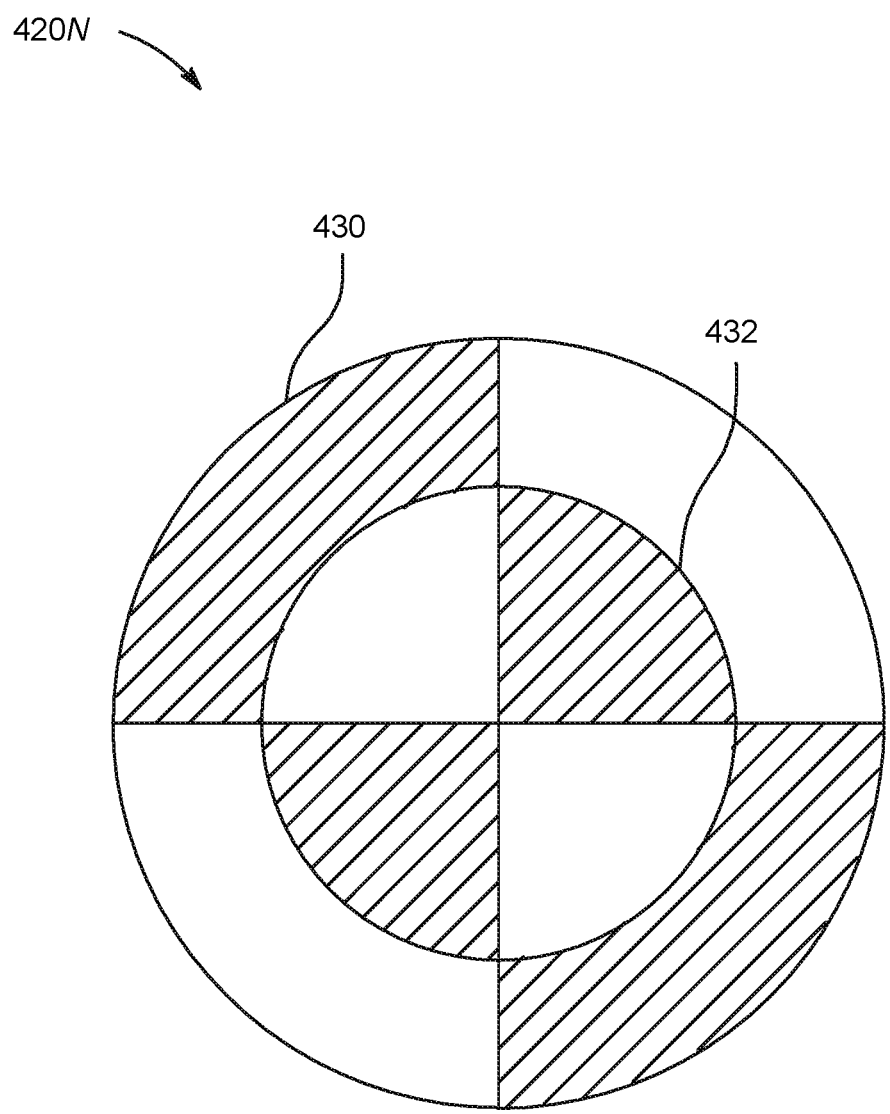

FIG. 4C is illustrates another example configuration of a fiducial marker 420N. In this example, the fiducial marker 420N includes an outer pattern 430 and an inner pattern 432. The outer pattern 430 in this example is a circle, and the inner pattern 432 is an inner circle. However, it should be noted that in other examples the outer pattern 430 and/or the inner pattern 432 can have any other shape such as, for example, a square, triangle, rectangle, octagon, etc.

In some examples, the outer pattern 430 and/or the inner pattern 432 can have any shape, configuration, arrangement, characteristic and/or design. Moreover, the outer pattern 430 and/or the inner pattern 432 can be based on any feature, element, or item that is visible in the IR and/or visible spectrum. For example, the outer pattern 430 and/or the inner pattern 432 can include colors, lines, letters, symbols, codes, textures, etchings, nonhomogeneities, substances, images, lighting (e.g., in visible light or IR spectrum), back-lighting (e.g., in visible light or IR spectrum), etc.

In some cases, the inner pattern 432 can be used to provide more accurate localization of the fiducial marker 420N. For example, the inner pattern 432 can be used as a landmark to repeatedly and/or precisely localize a specific point(s) on the fiducial marker 420N. In some cases, the image sensor systems (e.g., 152) used to detect the fiducial marker 420N can implement adaptive striding to increase its efficiency. As a result, the bounding box around the fiducial marker 420N detected by the image sensor systems may not always be precisely or accurately centered on the fiducial marker 420N, which can affect the triangulation accuracy. For example, the bounding box around the fiducial marker 420N can be off or offset by a number of pixels, which can affect the triangulation accuracy.

In some examples, to improve the precision of key point localization within the fiducial marker an image sensor system (e.g., 152) can run fast and coarse object detection on the whole pattern (e.g., the outer pattern 430). After detecting the outer pattern 430 based on the fast and coarse object detection, the image sensor system can run a fine-grained search of the inner pattern 432 within the detection window associated with the outer pattern 430. This can also improve the localization accuracy at larger orientations of the inner pattern 432 with respect to the image sensor system. In some examples, this two-stage localization algorithm can be supported by robustly training for larger orientations. In some cases, this two-stage localization algorithm can also leverage branch-on-fail mechanisms (e.g., conditional branch in machine learning object detection) for multi-object detection by the image sensor system.

Figure 5:
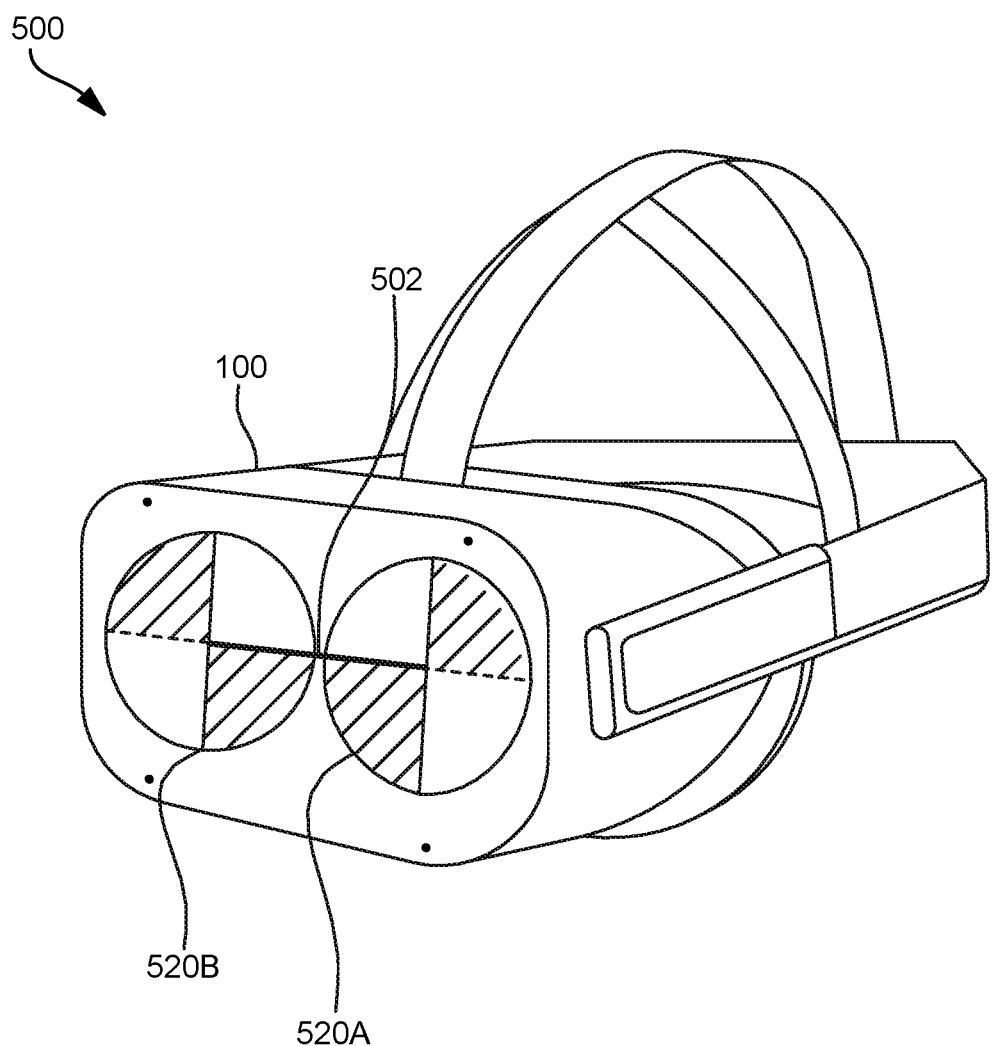
FIG. 5 illustrates an example reference line projected between fiducial markers and used for pose transformation between reference and observed patterns, in accordance with some examples of the present disclosure.

FIG. 5 illustrates an example reference line 502 projected between fiducial markers 520A and 520B and used for pose transformation between reference and observed patterns. The reference line 502 can join (and/or can be projected across) two or more points on the fiducial markers 520A and 520B. In this example, the reference line 502 joins the centers of the fiducial markers 520A and 520B. A reference location of the reference line 502 can be calculated based on a reference coordinate system (e.g., X, Y, Z coordinate system) in 3D space, such as a world or homogeneous coordinate system. Moreover, an observed location of the reference line 502 can be determined based on images captured by the image sensor systems 152. The observed location can be determined with respect to an image coordinate system (e.g., a coordinate system associated with the images captured by the image sensor systems 152).

In some examples, the reference location of the reference line 502 and the observed location of the reference line 502 can be compared to calculate a pose of the fiducial markers 520A and 520B and/or improve a pose estimation accuracy when calculating a pose of the fiducial markers 520A and 520B. In some examples, the reference location of the reference line 502 and the observed location of the reference line 502 can be used to transform an observed pose of the fiducial markers 520A and 520B with respect to a reference pose of the fiducial markers 520A and 520B, as further described below with respect to FIG. 6. In some examples, the relative distance and/or angles between coordinate planes (e.g., X, Y, Z coordinate planes) projected from and/or between the reference location of the reference line 502 and the observed location of the reference line 502 can be used to translate an observed pose of the reference line 502 with respect to a reference pose of the reference line 502. The translated pose of the reference line 502 can be used to determine the relative poses of the patterns associated with the reference line 502.

Figure 6:
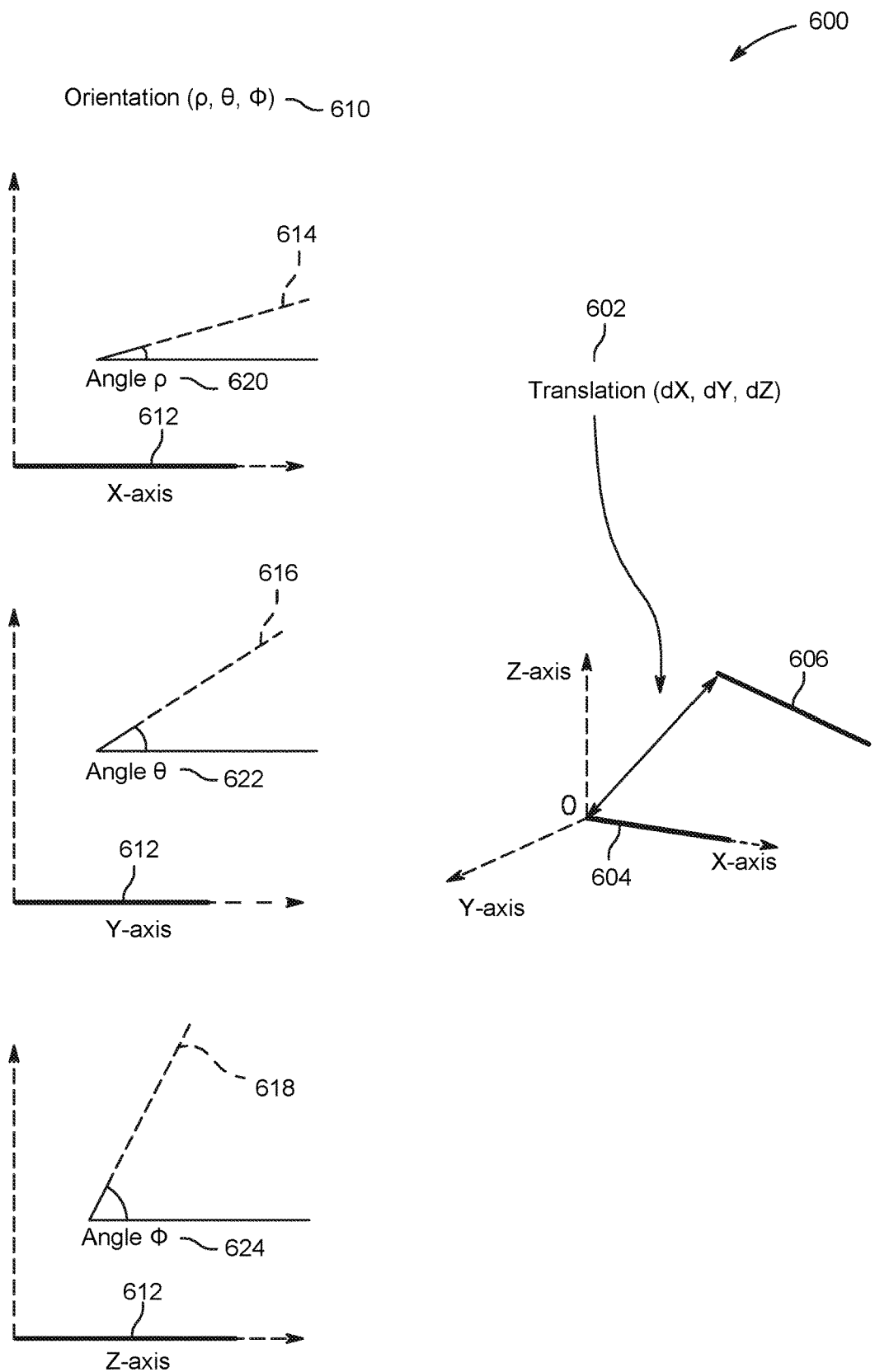
FIG. 6 is a diagram illustrating an example pose transformation between reference patterns and observed patterns, in accordance with some examples of the present disclosure.

FIG. 6 is a diagram illustrating an example pose transformation 600 between reference patterns (e.g., reference fiducial markers 520A and 520B) and observed patterns (e.g., observed fiducial markers 520A and 520B). In some cases, the observed patterns can include patterns detected in images captured via image sensor systems 152, and the reference patterns can include patterns determined with respect to a reference coordinate system (e.g., a world coordinate or homogenous coordinate system).

In the example shown in FIG. 6, a translation transformation 602 is calculated between an observed location 606 of a reference line (e.g., reference line 502) and a reference location 604 of the reference line to determine an actual, absolute, and/or estimated position of the reference line. The translation transformation 602 can be calculated based on the reference location 604 of the reference line and the observed location 606 of the reference line. In some cases, the translation transformation 602 can be based on projections from the reference location 604 of the reference line and the observed location 606 of the reference line, along an X axis, a Y axis, and a Z axis. In some examples, the projections can reflect a difference in the reference location 604 and the observed location 606 of the reference line.

For example, projections from the reference location 604 (or one or more points in the reference location 604) and the observed location 606 (or one or more points in the observed location 606) along the X axis, the Y axis, and the Z axis can be compared to translate or recover the location of the reference line. In some cases, the projections can be used to perform the translation transformation 602 between the reference location 604 of the reference line and the observed location 606 of the reference line along the X axis, the Y axis, and the Z axis.

In some examples, the reference location 604 of the reference line can be a known or calculated location of the reference line (and/or one or more points of the reference line). In some cases, the reference location 604 of the reference line (depicted along the X axis) can be calculated by triangulating one or more points of the reference line from a reference frame and/or coordinate system. In some cases, such triangulation can leverage information known about the relative configuration and/or location of patterns associated with the reference line, such as the reference and observed patterns (e.g., fiducial markers 520A and 520B). In some examples, the observed location 606 of the reference line can be the location of the reference line (and/or one or more points of the reference line) observed and/or calculated from an image(s) (e.g., obtained via one or more image sensor systems 152) capturing the reference line.

Further, a rotation transformation 610 between a reference orientation 612 of the reference line (depicted variously along the Y axis, the X axis, and the Z axis) and an observed orientation of the reference line can be calculated by recovering or estimating angles 620, 622, 624 of rotation for the reference line along the X axis, the Y axis, and the Z axis. The angles 620, 622, 624 of rotation can be calculated based on projections 614, 616, and 618 generated for an observed orientation of the reference line and/or the reference orientation 612 of the reference line along the X axis, the Y axis, and the Z axis. For example, the angle 620 of rotation of the reference line along the X axis can be calculated based on a projection 614 from the reference orientation 612 along the X axis. Similarly, the angle 622 of rotation of the reference line along the Y axis can be calculated based on a projection 616 from the reference orientation 612 along the Y axis. Finally, the angle 624 of rotation of the reference line along the Z axis can be calculated based on a projection 618 from a reference orientation 612 along the Z axis.

In some examples, the angles 620, 622, and 624 of rotation can be used to estimate or recover the orientation of the reference line. Moreover, in some examples, a point(s) connecting the projections 614, 616, and 618 along the X axis, the Y axis, and the Z axis can be used to calculate the angles 620, 622, and 624 of rotation of the reference line and/or the orientation of the reference line.

The translation transformation 602 and the rotation transformation 610 can be used to perform the pose transformation 600 between the pose of the reference pattern associated with the reference line and the observed pose of the observed pattern associated with the reference line. In some examples, the pose transformation 600 can be used to estimate the relative pose of the reference pattern (e.g., reference fiducial markers 520A and 520B) associated with the reference line and the observed pose of the observed pattern (e.g., observed pose of the fiducial markers 520A and 520B) associated with the reference line, which can reflect the relative location and orientation of the reference and observed patterns (e.g., fiducial markers 520A and 520B). In some examples, the relative 6DoF pose of the auxiliary system 150 and the main processing system 100 can be calculated based on the relative pose of the reference pattern and the observed pattern.

In some examples, the relative 6DoF pose of the auxiliary system 150 and the main processing system 100 can be calculated by triangulating the 3D location of a group of the patterns (e.g., fiducial markers 520A and 520B) observed by the image sensor systems 152, the relative pose of that group of the patterns, and the calibrated, relative location of the image sensor systems 152. In some cases, the image sensor systems 152 on the auxiliary system 150 can capture images or frames of the reference line (and/or the associated patterns and/or points thereof), and the images or frames can be used to estimate the relative 6DoF pose and/or motion of the auxiliary system 150 and the main processing system 100 by computing the relative transformation between the pose of the auxiliary system 150 and the pose of the main processing system 100 (and/or the patterns or fiducial markers 520A and 520B). In some examples, the pose of the main processing system 100 can be computed based on the pose transformation 600, as previously explained.

In some examples, two or more image sensor systems 152 on the auxiliary system 150 can capture images or frames of fiducial markers (e.g., two or more of the fiducial markers) on the main processing system 100, and the pixel locations in the images or frames corresponding to points in the fiducial markers captured in the images or frames can be used to calculate the relative 6DoF pose of the auxiliary system 150 and the main processing system 100. For example, the 6DoF pose of the two or more image sensor systems 152 can be calibrated with respect to each other. The two or more image sensor systems 152 can capture images or frames of a same set of fiducial markers (e.g., 520A and 520B) on the main processing system 100, and detect pixels corresponding to points in the fiducial markers captured in the images or frames. The location of the points in the fiducial markers can be triangulated based on those pixels corresponding to the points in the fiducial markers. The triangulated location of the points corresponding to the pixels can be used to calculate the 3D location and relative pose of the fiducial markers. The 3D location and relative pose of the fiducial markers can reflect the 3D location and pose of the main processing system 100 associated with the fiducial markers. Thus, the 3D location and relative pose of the fiducial markers can be used with the relative pose of the two or more image sensor systems 152 to estimate the relative 6DoF pose of the auxiliary system 150 and the main processing system 100.

Having disclosed example systems, components and concepts, the disclosure now turns to the example method 700 for estimating the relative pose of an auxiliary system (e.g., 150) and a main processing system (e.g., 100), as shown in FIG. 7. The steps outlined herein are non-limiting examples provided for illustration purposes, and can be implemented in any combination thereof, including combinations that exclude, add, or modify certain steps.

At block 702, the method 700 can include receiving one or more images captured by each image sensor system from a set of image sensor systems (e.g., 152) on a first device (e.g., auxiliary system 150). The one or more images can capture a set of patterns (e.g., 120A through 120N) on a second device (e.g., main processing system 100). In some examples, the set of patterns can be fiducial markers containing one or more patterns. Moreover, the set of patterns can be visible in the infrared spectrum or the visible light spectrum.

The set of patterns can have a predetermined configuration on the second device. The predetermined configuration of the set of patterns can include, for example and without limitation, a relative location of each pattern on the second device, a relative orientation of each pattern on the second device, a shape of each pattern, a size of each pattern, a characteristic of each pattern, and/or an arrangement of the set of patterns. In some examples, one or more patterns from the set of patterns can include encoded machine-readable information, as shown in FIG. 4B. The encoded machine-readable information encoded in a pattern can include location information associated with the pattern, an identifier associated with the pattern, a unique code, a setting, information about a user account (e.g., a player in a game, a user profile, etc.) associated with an XR application hosted on the second device.

In some cases, the first device can have lower power requirements than the second device. For example, the first device can consume less power and/or have lower power components than the second device. In some examples, the first device can be a hand controller device and the second device can be a head-mounted display (HMD). In other examples, the first device can be any other type of controller, auxiliary device, or lower-power device, and the second device can be any other type of higher-power device, wearable XR device, etc. Moreover, in some cases, each image sensor system of the set of image sensor systems can be a low power image sensor system, as previously explained.

In some cases, each image sensor system can capture at least one image of at least one pattern. In some cases, two or more image sensor systems can each capture an image of one or more of the same patterns. In some examples, the set of image sensor systems can represent all image sensor systems on the first device. In other examples, the set of image sensor systems can represent a subset of all image sensor systems on the first device. For example, the set of image sensor systems can represent a subset of image sensor systems that can were able to capture images of one more patterns from the set of patterns from their specific poses and/or perspectives. In other word, the set of image sensor systems can represent a subset of image sensor systems on the first device that had one or more patterns within their FoV when capturing the one or more images.

In some cases, the number of image sensor systems that capture an image of one or more patterns can vary as the relative poses of the image sensor systems and the set of patterns on the second device change, since such changes in relative poses can add or remove one or more patterns from a FoV of an image sensor system. Indeed, one or more patterns from the set of patterns on the second device can at times be within a FoV of all image sensor systems the first device, which would allow all image sensor systems on the first device to capture an image the one or more patterns, while at other times, some or all of the set of patterns may be within a FoV of only one, two or more, or even none of the image sensor systems on the first device. In some cases, if none of the set of patterns are within a FoV of any image sensor system on the first device, the auxiliary device and/or the main processing system may use inertial measurements from respective sensors (e.g., IMU, gyroscope, accelerometer, etc.) to calculate or track pose information.

At block 704, the method 700 can include determining, from the one or more images captured by each image sensor system, a set of pixels corresponding to the set of patterns on the second device. For example, each image captured by an image sensor system can capture one or more patterns. Thus, the image can include pixels corresponding to one or more points in one or more patterns. The image sensor system can detect the one or more patterns and the one or more points in the one or more patterns. The image sensor system can then identify one or more pixels in the image (and their pixel location within the image) corresponding to (e.g., representing, capturing, depicting, etc.) the one or more points in the one or more patterns. The one or more pixels in the image (and their pixel location) can be used to estimate the location and/or pose of the one or more patterns associated with the one or more points corresponding to the pixels, as further described herein.

At block 706, the method 700 can include determining, based on the set of pixels corresponding to the set of patterns on the second device, a location and relative pose in space (e.g., in 3D space) of each pattern from the set of patterns. For example, as previously explained, each image captured by an image sensor system can capture one or more patterns. The pixels in the image corresponding to one or more points in the one or more patterns can be identified and used to estimate the location and/or pose of the one or more patterns. In some cases, the location of a pixel within the image can be used to triangulate a point in a pattern captured by the image and corresponding to that pixel. As another example, the location of pixels within images captured by the set of image sensor systems and corresponding to points in the set of patterns can be compared, triangulated, and/or used to estimate the 3D location and orientation of each pattern from the set of patterns. The 3D location and orientation of each pattern can also be used to compute the relative 6DoF pose of each pattern.

In some examples, the location of each pixel (e.g., a coordinate and/or point associated with the pixel) corresponding to a point in a pattern can be projected to the point in the pattern along one or more planes (e.g., along one or more axes in an image coordinate system) and compared with a projection of the point in the pattern from a reference coordinate system (e.g., a world or homogenous coordinate system) to determine the 3D position of the point in the pattern. In some cases, the location of the point in the pattern within the image (and/or the image coordinate system) can be translated with respect to the location of the point in the reference coordinate system to determine the 3D location of the point in the pattern.

Moreover, in some cases, the orientation of the point in the pattern within the image (and/or the image coordinate system) can be rotated with respect to the orientation of the point in the reference coordinate system to determine the 3D orientation of the point in the pattern. The 3D location and orientation of the point in the pattern can be used to estimate the 6DoF pose of the pattern. Moreover, the 3D location and orientation of points in the set of patterns can be used to estimate the relative 6DoF pose of the set of patterns. The relative 6DoF pose of the set of patterns can also be used to determine the 6DoF pose of the main processing system 100 and/or the auxiliary system 150, as further described herein.

In some cases, determining the location and relative pose in space of each pattern from the set of patterns can include determining 3D orientations of the set of patterns by rotating 3D coordinates in space (e.g., X coordinates, Y coordinates, Z coordinates) that correspond to the set of pixels corresponding to the set of patterns, and determining 3D locations of the set of patterns by translating the 3D coordinates in space corresponding to the set of pixels corresponding to the set of patterns. In some examples, the 3D coordinates can be rotated relative to reference 3D coordinates and the 3D coordinates can be translated relative to the reference 3D coordinates. Moreover, in some examples, the relative pose of each pattern can be based on the 3D orientations of the set of patterns and the 3D locations of the set of patterns. Also, the location of each pattern can include, for example, a respective 3D location from the 3D locations of the set of patterns.

In some aspects, determining the set of pixels corresponding to the set of patterns can include detecting, based on the one or more images captured by each image sensor, each pattern from the set of patterns on the second device, and identifying one or more points in each pattern from the set of patterns. The one or more points identified in each pattern can correspond to the one or more pixels from the set of pixels. Moreover, as previously noted, the location and relative pose in space of each pattern can be determined based on the one or more points in each pattern.

In other aspects, determining the set of pixels corresponding to the set of patterns can include detecting, based on the one or more images captured by each image sensor, each pattern from the set of patterns on the second device, detecting for each pattern, a smaller inner pattern, and identifying one or more points in each smaller inner pattern. The one or more points can correspond to one or more pixels from the set of pixels, and the location and relative pose in space of each pattern can be based on the one or more points in each smaller inner pattern.

At block 708, the method 700 can include determining, based on the location and relative pose in space of each pattern from the set of patterns, a pose of the first device relative to the second device. For example, the 6DoF pose of each pattern can be used to determine the 6DoF pose of the second device (e.g., main processing system 100) and/or the relative 6DoF pose of the first device (e.g., auxiliary system 150). In some cases, the 6DoF pose of the second device (e.g., main processing system 100) and the first device (e.g., auxiliary system 150) can be computed with respect to each other to obtain relative 6DoF poses of the first and second devices. In some examples, the relative 6DoF poses of the first and second devices can be used to coordinate and/or relate movements, poses, interactions, representations, etc., of the first and second devices in an XR experience, such as an XR game running on the second device, an XR shopping application running on the second device, an XR modeling application running on the second device, an XR medical application running on the second device, etc. In some examples, the relative 6DoF poses of the first and second devices can be used to perform various tracking and localization based operations such as, for example, collision avoidance, navigation, mapping, interactions with real-world objects, autonomous device operations or tasks, etc.

In some cases, the pose of the first device relative to the second device can be determined further based on predetermined relative locations and orientations of the set of image sensor systems on the first device. For example, the image sensor systems on the first device can be configured on the first device at specific distances, orientations, locations, angle of separation, etc. This information can be known and used to determine their relative poses at the first device. The relative poses of the image sensor systems on the first device can be used as additional parameters for calculating the location and relative pose in space of each pattern from the set of patterns and/or the pose of the first device relative to the second device.

In some examples, the method 700 can include determining 3D coordinates of one or more points in space associated with a scene captured by the set of image sensor system (e.g., a scene in the one or more images), and determining, based on the predetermined relative locations and orientations of the set of image sensor systems and the 3D coordinates of the one or more points in space, relative 3D poses of the set of image sensor systems on the first device. In some examples, the pose of the first device relative to the second device can be further based on the relative 3D poses of the set of image sensors on the first device. Moreover, in some cases, the relative 3D poses of the set of image sensor systems can be, for example, relative 6DoF poses in 3D space.

In some aspects, determining the pose of the first device relative to the second device can include determining a pose of the second device relative to the first device. The pose of the first device and the pose of the second device can be, for example, relative 6DoF poses.

In some aspects, the method 700 can include detecting, based on one or more additional images captured by one or more image sensor systems from the set of image sensors, one or more additional patterns on an object captured in the one or more additional images, determining one or more pixels in the one or more additional images that correspond to the one or more additional patterns on the object, and determining, based on the one or more pixels, an additional 6DoF pose of the object relative to the 6DoF pose of the first device and/or the 6DoF pose of the second device. In some cases, the object can be, for example, a wall, a display device, a video game console, a piece of furniture, an appliance, a household item, etc.

In some examples, the method 700 may be performed by one or more computing devices or apparatuses. In one illustrative example, the method 700 can be performed by the main processing system 100 and/or the auxiliary system 150 shown in FIG. 1 and/or one or more computing devices with the computing device architecture 800 shown in FIG. 8. In some cases, such a computing device or apparatus may include a processor, microprocessor, microcomputer, or other component of a device that is configured to carry out the steps of the method 700. In some examples, such computing device or apparatus may include one or more sensors configured to capture image data. For example, the computing device can include a smartphone, a head-mounted display, a mobile device, or other suitable device. In some examples, such computing device or apparatus may include a camera configured to capture one or more images or videos. In some cases, such computing device may include a display for displaying images. In some examples, the one or more sensors and/or camera are separate from the computing device, in which case the computing device receives the sensed data. Such computing device may further include a network interface configured to communicate data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The method 700 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the method 700 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 8 illustrates an example computing device architecture 800 of an example computing device which can implement various techniques described herein. For example, the computing device architecture 800 can implement at least some portions of the main processing system 100 shown in FIG. 1, and perform ToF signal processing operations as described herein. The components of the computing device architecture 800 are shown in electrical communication with each other using a connection 805, such as a bus. The example computing device architecture 800 includes a processing unit (CPU or processor) 810 and a computing device connection 805 that couples various computing device components including the computing device memory 815, such as read only memory (ROM) 820 and random access memory (RAM) 825, to the processor 810.

The computing device architecture 800 can include a cache of high-speed memory connected directly with, in close proximity to, or integrated as part of the processor 810. The computing device architecture 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other computing device memory 815 may be available for use as well. The memory 815 can include multiple different types of memory with different performance characteristics. The processor 810 can include any general purpose processor and a hardware or software service stored in storage device 830 and configured to control the processor 810 as well as a special-purpose processor where software instructions are incorporated into the processor design. The processor 810 may be a self-contained system, containing multiple cores or processors, a bus, memory controller, cache, etc. A multi-core processor may be symmetric or asymmetric.

To enable user interaction with the computing device architecture 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art, such as a display, projector, television, speaker device. In some instances, multimodal computing devices can enable a user to provide multiple types of input to communicate with the computing device architecture 800. The communication interface 840 can generally govern and manage the user input and computing device output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof. The storage device 830 can include software, code, firmware, etc., for controlling the processor 810. Other hardware or software modules are contemplated. The storage device 830 can be connected to the computing device connection 805. In one aspect, a hardware module that performs a particular function can include the software component stored in a computer-readable medium in connection with the necessary hardware components, such as the processor 810, connection 805, output device 835, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method comprising:
    receiving one or more images captured by at least one image sensor system on a first device, the one or more images depicting a set of patterns having a predetermined configuration on a second device and at least one reference line between the set of patterns, the predetermined configuration allowing disambiguation of at least one position of at least one pattern of the set of patterns relative to at least one other position of at least one other pattern of the set of patterns, wherein the first device has lower power requirements than the second device;
    determining, from the one or more images captured by the at least one image sensor system, a set of pixels corresponding to the set of patterns on the second device;
    determining a reference location for the at least one reference line between the set of patterns based on a reference coordinate system;
    determining an observed location of the at least one reference line depicted in the one or more images with respect to an image coordinate system associated with the one or more images;
    determining three-dimensional (3D) locations of the set of patterns at least in part by translating 3D coordinates of the set of pixels corresponding to the set of patterns based on a comparison between the reference location and the observed location of the at least one reference line, wherein a 3D location of each pattern of the set of patterns comprises a respective 3D location from the 3D locations of the set of patterns;
    determining 3D orientations of the set of patterns at least in part by rotating the 3D coordinates of the set of pixels corresponding to the set of patterns based on the comparison between the reference location and the observed location of the at least one reference line, wherein a relative 3D pose in space of each pattern of the set of patterns is based on a respective 3D orientation from the 3D orientations of the set of patterns;

determining, based on a first orientation of a first pattern from the set of patterns in the predetermined configuration relative to a second orientation of a second pattern from the set of patterns in the predetermined configuration, that the first pattern is at a left, right, top, or bottom position in the predetermined configuration relative to the second pattern; and determining, based on the 3D location and the relative 3D pose in space of each pattern from the set of patterns and further based on the determining that the first pattern is at a left, right, top, or bottom position in the predetermined configuration relative to the second pattern, a pose of the first device relative to the second device.

2. The method of claim 1, wherein the at least one image sensor system includes a set of image sensor systems, and wherein determining the pose of the first device relative to the second device is further based on predetermined relative locations and orientations of the set of image sensor systems on the first device.

3. The method of claim 2, further comprising:
determining 3D coordinates of one or more points in space associated with a scene captured by the set of image sensor systems; and
determining, based on the predetermined relative locations and orientations of the set of image sensor systems and the 3D coordinates of the one or more points in space, relative 3D poses of the set of image sensor systems on the first device, wherein the pose of the first device relative to the second device is further based on the relative 3D poses of the set of image sensor systems on the first device.

4. The method of claim 1, wherein the pose of the first device relative to the second device comprises a six degrees of freedom (6DoF) pose, and wherein the predetermined configuration of the set of patterns comprises at least one of a relative location of each pattern on the second device, a relative orientation of each pattern on the second device, a shape of each pattern, a size of each pattern, a characteristic of each pattern, or an arrangement of the set of patterns.

5. The method of claim 1, wherein determining the pose of the first device relative to the second device further comprises determining a pose of the second device relative to the first device, wherein the pose of the first device includes a first 6DoF pose and the pose of the second device includes a second 6DoF pose.

6. The method of claim 1, wherein the first device comprises a hand controller device and the second device comprises a head-mounted display device.

7. The method of claim 1, wherein the at least one image sensor system comprises an image sensor system that has a lower power consumption than an additional image sensor system of the second device, and wherein each pattern of the set of patterns is visible in at least one of an infrared spectrum or a visible light spectrum.

8. The method of claim 1, wherein at least one pattern of the set of patterns comprises encoded machine-readable information, the encoded machine-readable information comprising at least one of location information associated with the at least one pattern, an identifier associated with the at least one pattern, a unique code, a setting, or information about a user account associated with an extended reality application hosted on at least one of the first device or the second device.

9. The method of claim 1, wherein determining the set of pixels corresponding to the set of patterns on the second device comprises:
detecting, based on the one or more images captured by the at least one image sensor system, each pattern from the set of patterns on the second device; and
identifying one or more points in each pattern from the set of patterns, the one or more points corresponding to one or more pixels from the set of pixels,
wherein determining the 3D location and relative pose in space of each pattern is based on the one or more points in each pattern.

10. The method of claim 1, wherein determining the set of pixels corresponding to the set of patterns on the second device comprises:
detecting, based on the one or more images captured by the at least one image sensor system, each pattern from the set of patterns on the second device;
for each pattern, detecting a smaller inner pattern; and
identifying one or more points in each smaller inner pattern, the one or more points corresponding to one or more pixels from the set of pixels,
wherein determining the 3D location and relative pose in space of each pattern is based on the one or more points in each smaller inner pattern.

11. The method of claim 1, wherein determining the pose of the first device relative to the second device comprises determining a 6DoF pose of the first device relative to the second device and a 6DoF pose of the second device relative to the first device, the method further comprising:
detecting, based on one or more additional images captured by the at least one image sensor system, one or more additional patterns on an object captured in the one or more additional images;
determining one or more pixels in the one or more additional images that correspond to the one or more additional patterns on the object; and
determining, based on the one or more pixels, an additional 6DoF pose of the object relative to at least one of the 6DoF pose of the first device or the 6DoF pose of the second device.

12. The method of claim 11, wherein the object comprises a wall, a display device, a video game console, a piece of furniture, an appliance, or a household item.

13. An apparatus comprising:
one or more processors operably configured to:
receive one or more images captured by at least one image sensor system on the apparatus, the one or more images depicting a set of patterns having a predetermined configuration on a device and at least one reference line between the set of patterns, the predetermined configuration allowing disambiguation of at least one position of at least one pattern of the set of patterns relative to at least one other position of at least one other pattern of the set of patterns, wherein the apparatus has lower power requirements than the device;
determine, from the one or more images captured by the at least one image sensor system, a set of pixels corresponding to the set of patterns on the device;
determine a reference location for the at least one reference line between the set of patterns based on a reference coordinate system;
determine an observed location of the at least one reference line depicted in the one or more images with respect to an image coordinate system associated with the one or more images;

determine 3D locations of the set of patterns at least in part by translating 3D coordinates of the set of pixels corresponding to the set of patterns based on a comparison between the reference location and the observed location of the at least one reference line, wherein a 3D location of each pattern of the set of patterns comprises a respective 3D location from the 3D locations of the set of patterns;

determine 3D orientations of the set of patterns at least in part by rotating the 3D coordinates of the set of pixels corresponding to the set of patterns based on the comparison between the reference location and the observed location of the at least one reference line, wherein a relative 3D pose in space of each pattern of the set of patterns is based on a respective 3D orientation from the 3D orientations of the set of patterns;

determine, based on a first orientation of a first pattern from the set of patterns in the predetermined configuration relative to a second orientation of a second pattern from the set of patterns in the predetermined configuration, that the first pattern is at a left, right, top, or bottom position in the predetermined configuration relative to the second pattern; and determine, based on the 3D location and the relative 3D pose in space of each pattern from the set of patterns and further based on the determining that the first pattern is at a left, right, top, or bottom position in the predetermined configuration relative to the second pattern, a pose of the apparatus relative to the device.

14. The apparatus of claim 13, wherein the at least one image sensor system includes a set of image sensor systems, and wherein the one or more processors are configured to determine the pose of the apparatus relative to the device further based on predetermined relative locations and orientations of the set of image sensor systems on the apparatus.

15. The apparatus of claim 14, the one or more processors being configured to:
determine 3D coordinates of one or more points in space associated with a scene captured by the set of image sensor systems; and
determine, based on the predetermined relative locations and orientations of the set of image sensor systems and the 3D coordinates of the one or more points in space, relative 3D poses of the set of image sensor systems, wherein the pose of the apparatus relative to the device is further based on the relative 3D poses of the set of image sensor systems.

16. The apparatus of claim 13, wherein the pose of the apparatus relative to the device comprises a six degrees of freedom (6DoF) pose, and wherein the predetermined configuration of the set of patterns comprises at least one of a relative location of each pattern on the device, a relative orientation of each pattern on the device, a shape of each pattern, a size of each pattern, a characteristic of each pattern, or an arrangement of the set of patterns.

17. The apparatus of claim 13, wherein, to determine the pose of the apparatus relative to the device further, the one or more processors are configured to determine a pose of the device relative to the apparatus, wherein the pose of the apparatus includes a first 6DoF pose and the pose of the device includes a second 6DoF pose.

18. The apparatus of claim 13, wherein the apparatus is a hand controller device and the device comprises a head-mounted display device.

19. The apparatus of claim 13, wherein the at least one image sensor system comprises an image sensor system that has a lower power consumption than an additional image sensor system of the device, and wherein each pattern of the set of patterns is visible in at least one of an infrared spectrum or a visible light spectrum.

20. The apparatus of claim 13, wherein at least one pattern of the set of patterns comprises encoded machine-readable information, the encoded machine-readable information comprising at least one of location information associated with the at least one pattern, an identifier associated with the at least one pattern, a unique code, a setting, or information about a user account associated with an extended reality application hosted on at least one of the apparatus or the device.

21. The apparatus of claim 13, wherein, to determine the set of pixels corresponding to the set of patterns on the device, the one or more processors are configured to:
detect, based on the one or more images captured by the at least one image sensor system, each pattern from the set of patterns on the device;
identify one or more points in each pattern from the set of patterns, the one or more points corresponding to one or more pixels from the set of pixels; and
determine the 3D location and relative pose in space of each pattern based on the one or more points in each pattern.

22. The apparatus of claim 13, wherein, to determine the set of pixels corresponding to the set of patterns on the device, the one or more processors are configured to:
detect, based on the one or more images captured by the at least one image sensor system, each pattern from the set of patterns on the device;
for each pattern, detect a smaller inner pattern;
identify one or more points in each smaller inner pattern, the one or more points corresponding to one or more pixels from the set of pixels; and
determine the 3D location and relative pose in space of each pattern based on the one or more points in each smaller inner pattern.

23. The apparatus of claim 13, wherein, to determine the pose of the apparatus relative to the device, the one or more processors are configured to determine a 6DoF pose of the apparatus relative to the device and a 6DoF pose of the device relative to the apparatus, the one or more processors further being configured to:
detect, based on one or more additional images captured by the at least one image sensor system, one or more additional patterns on an object captured in the one or more additional images;
determine one or more pixels in the one or more additional images that correspond to the one or more additional patterns on the object; and
determine, based on the one or more pixels, an additional 6DoF pose of the object relative to at least one of the 6DoF pose of the apparatus or the 6DoF pose of the device.

24. The apparatus of claim 23, wherein the object comprises a wall, a display device, a video game console, a piece of furniture, an appliance, or a household item.

25. The apparatus of claim 13, wherein the apparatus is a mobile device.

26. A non-transitory computer-readable storage medium of a first device comprising:
instructions stored thereon which, when executed by one or more processors, cause the one or more processors to:

receive one or more images captured by at least one image sensor system on the first device, the one or more images depicting a set of patterns having a predetermined configuration on a second device and at least one reference line between the set of patterns, the predetermined configuration allowing disambiguation of at least one position of at least one pattern of the set of patterns relative to at least one other position of at least one other pattern of the set of patterns, wherein the first device has lower power requirements than the second device;

determine, from the one or more images captured by the at least one image sensor system, a set of pixels corresponding to the set of patterns on the second device;

determine a reference location for the at least one reference line between the set of patterns based on a reference coordinate system;

determine an observed location of the at least one reference line depicted in the one or more images with respect to an image coordinate system associated with the one or more images;

determine 3D locations of the set of patterns at least in part by translating 3D coordinates of the set of pixels corresponding to the set of patterns based on a comparison between the reference location and the observed location of the at least one reference line, wherein a 3D location of each pattern of the set of patterns comprises a respective 3D location from the 3D locations of the set of patterns;

determine 3D orientations of the set of patterns at least in part by rotating the 3D coordinates of the set of pixels corresponding to the set of patterns based on the comparison between the reference location and the observed location of the at least one reference line, wherein a relative 3D pose in space of each pattern of the set of patterns is based on a respective 3D orientation from the 3D orientations of the set of patterns;

determine, based on a first orientation of a first pattern from the set of patterns in the predetermined configuration relative to a second orientation of a second pattern from the set of patterns in the predetermined configuration, that the first pattern is at a left, right, top, or bottom position in the predetermined configuration relative to the second pattern; and determine, based on the 3D location and the relative 3D pose in space of each pattern from the set of patterns and further based on the determining that the first pattern is at a left, right, top, or bottom position in the predetermined configuration relative to the second pattern, a pose of the first device relative to the second device.

27. The non-transitory computer-readable storage medium of claim 26, wherein the at least one image sensor system includes a set of image sensor systems, and wherein the instructions, when executed by the one or more processors, cause the one or more processors to determine the pose of the first device relative to the second device further based on predetermined relative locations and orientations of the set of image sensor systems on the first device.

28. The non-transitory computer-readable storage medium of claim 27, wherein the instructions, when executed by the one or more processors, cause the one or more processors to:
   determine 3D coordinates of one or more points in space associated with a scene captured by the set of image sensor systems; and
   determine, based on the predetermined relative locations and orientations of the set of image sensor systems and the 3D coordinates of the one or more points in space, relative 3D poses of the set of image sensor systems on the first device, wherein the pose of the first device relative to the second device is further based on the relative 3D poses of the set of image sensor systems on the first device.

29. The non-transitory computer-readable storage medium of claim 26, wherein the pose of the first device relative to the second device comprises a six degrees of freedom (6DoF) pose, and wherein the predetermined configuration of the set of patterns comprises at least one of a relative location of each pattern on the second device, a relative orientation of each pattern on the second device, a shape of each pattern, a size of each pattern, a characteristic of each pattern, or an arrangement of the set of patterns.

30. The non-transitory computer-readable storage medium of claim 26, wherein, to determine the pose of the first device relative to the second device, the instructions, when executed by the one or more processors, cause the one or more processors to determine a pose of the second device relative to the first device, wherein the pose of the first device includes a first 6DoF pose and the pose of the second device includes a second 6DoF pose.

\* \* \* \* \*